United States Patent
Schulz et al.

(10) Patent No.: US 7,201,789 B1
(45) Date of Patent: Apr. 10, 2007

(54) NANOCOMPOSITES WITH ACTIVATED INTERFACES PREPARED BY MECHANICAL GRINDING OF MAGNESIUM HYDRIDES AND USE FOR STORING HYDROGEN

(75) Inventors: Robert Schulz, Québec (CA); Guoxiang Liang, Québec (CA); Guy Lalande, Québec (CA); Jacques Huot, Québec (CA); Sabin Boily, Québec (CA); André Van Neste, Sainte-Foy (CA)

(73) Assignee: Hydro-Quebec, Montreal Quebec (CA)

( * ) Notice: Subject to any disclaimer, the term of this patent is extended or adjusted under 35 U.S.C. 154(b) by 0 days.

(21) Appl. No.: 09/529,910

(22) PCT Filed: Oct. 21, 1998

(86) PCT No.: PCT/CA98/00987

§ 371 (c)(1),
(2), (4) Date: Jun. 28, 2000

(87) PCT Pub. No.: WO99/20422

PCT Pub. Date: Apr. 29, 1999

(30) Foreign Application Priority Data

Oct. 22, 1997 (CA) .................................... 2217095

(51) Int. Cl.
*C01B 6/24* (2006.01)
(52) U.S. Cl. .......................................... 75/352; 75/357
(58) Field of Classification Search ................ 148/420; 75/352, 357; 420/900
See application file for complete search history.

(56) References Cited

U.S. PATENT DOCUMENTS 4,389,326 A 6/1983 Tanguy et al. .......... 252/188.26

5,162,108 A 11/1992 Bogdanovic ................ 423/647

(Continued)

FOREIGN PATENT DOCUMENTS

WO 9713503 * 4/1977

(Continued)

OTHER PUBLICATIONS

Y. Chen et al., "Formation of metal hydrides by mechanical alloying", J. of Alloys and Compounds, vol. 217, No. 2, pp. 182-184, 1995.

(Continued)

*Primary Examiner*—Sikyin Ip
(74) *Attorney, Agent, or Firm*—Foley & Lardner LLP

(57) ABSTRACT

The invention concerns a method for preparing a nanocomposite based on magnesium and another element or compound known to absorb hydrogen and hardly miscible when ground with magnesium or its hydride, such as vanadium, titanium or niobium. The method is characterised in that it consists in submitting magnesium or a compound based on magnesium known to absorb hydrogen to hydrogenation to obtain the corresponding hydride in powder form. Said resulting powder hydride is then mixed with the other element or compound or a hydride of said other element or compound and the resulting mixture is subjected to intense mechanical grinding until the corresponding nanocomposite is obtained in the form of a hydride. Finally, if necessary, the resulting nanocomposite is subjected to hydrogen desorption. The invention also concerns the resulting nanocomposite based on Mg, which has the advantage of being inexpensive and highly efficient for storing hydrogen owing to its microstructure (that is owing to the nature of its interfaces and the spatial distribution of its constituents) which is extremely fine and provides an excellent synergistic effect between Mg and the other element or compound.

16 Claims, 40 Drawing Sheets

U.S. PATENT DOCUMENTS

| | | | |
|---|---|---|---|
| 5,376,599 A | * | 12/1994 | Oshima et al. ............... 501/90 |
| 5,536,586 A | | 7/1996 | Tsushio et al. ............. 428/649 |
| 5,552,246 A | * | 9/1996 | Hong ...................... 429/218.2 |
| 5,554,456 A | | 9/1996 | Ovshinsky et al. ........... 429/59 |
| 5,882,623 A | | 3/1999 | Zaluska et al. |
| 5,906,792 A | | 5/1999 | Schulz et al. |
| 5,964,965 A | | 10/1999 | Schulz et al. |

FOREIGN PATENT DOCUMENTS

| | | |
|---|---|---|
| WO | 96/19594 | 6/1996 |
| WO | WO 96/23906 A1 | 8/1996 |
| WO | WO 97/26214 A1 | 7/1997 |
| WO | WO 97/43206 A1 | 11/1997 |

OTHER PUBLICATIONS

L. Guoxian et al., "Hydrogen absorption and desorption characteristics of mechanically milled Mg-35wt.%Fe $Ti_{1.2}$ powders", J. of Alloys and Compounds, vol. 223, pp. 111-114, 1995.

J. Huot et al., "Mechanical alloying of Mg-Ni compounds under hygrodgen and inert atmosphere", XP004077434 J. of Alloys and Compounds, vol. 231, pp. 815-819, 1995.

S. Orimo and H. Fujii, "Hydriding properties of the $Mg_2Ni$-H system synthesized by reactive mechanical Grinding", XP004077233, J. of Alloys and Compounds, vol. 232, pp. L16-L19, 1996.

"International Energy Agency Hydrogen Implementing Agreement"; Summary of Task Workshop, Mar. 1997 Alexandria, VA, Task 12-Mental Hydrides for Hydrogen Storage.

Semianual Reporty to the Executive Committee of the IEA Agreement on the Production and Utilization of Hydrogen submitted Apr. 30, 1997 for Meeting of Jun. 4-5, 1997.

International Energy Agency Hydrogen Implementing Agreement; Summary of Task Workshop, Jul. 14, 1997 Henniker, New Hampshire, Task 12-Metal Hydrides for Hydrogen Storage.

Poster List: Gordon Research Conference on Hydrogen-Metal Systems, New England College Henniker, New Hampshire, July 13-18, 1997.

Zaluska et al., "Mechanical Destabilization of Light Metal Hydride", Project 8, 1997 annual Report IEA Agreement on the Production an Utilization of Hydrogen, late 1998.

Zaluska et al., Synergy of hydrogen sorption in ball-milled hydrides of Mg and $Mg_2Ni$:, J. of Alloys and Compounds, 289:197-206, (1999), Elsevier Sciences.

* cited by examiner

US 7,201,789 B1

NANOCOMPOSITES WITH ACTIVATED INTERFACES PREPARED BY MECHANICAL GRINDING OF MAGNESIUM HYDRIDES AND USE FOR STORING HYDROGEN

TECHNICAL FIELD OF THE INVENTION

The present invention relates to new nanocomposites having activated interfaces, based on magnesium or a magnesium-containing compound and another chemical element or compound known to be able of absorbing hydrogen and of being little miscible with magnesium or its hydride, such as, for example, vanadium (V), titanium (Ti) and nobium (Nb).

The invention also relates to a process for the preparation of these new nanocomposites by intensive mechanical grinding of a magnesium hydride with the other element or compound.

The invention further relates to the use of these new nanocomposites for storing and/or transporting hydrogen.

BRIEF DESCRIPTION OF THE DRAWINGS

In order to facilitate the reading and understanding of the following description of the state-of-the-art in this field, and, accordingly, to make easier the understanding of the original features distinguishing the present invention over the known prior art, reference will be made hereinafter to the accompanying drawings in which.

BRIEF DESCRIPTION OF THE PRIOR ART

International patent application No. WO 96/23906 published on Aug. 8, 1996 discloses new compounds that are able to absorb hydrogen with a very good kinetics. These new compounds are in the form of powders of nanocrystalline particles of the formula:

$$Mg_{1-x}A_x$$

where A represents different metals including vanadium (V) and nobium (Nb) and x is an atomic fraction ranging from 0 to 0.3. By "nanocrystalline particles", it is meant particles with grains having an average size ranging between 0.1 and 100 nm.

In international application No. WO 96/23906, it is also disclosed that the said compounds can be prepared by subjecting a mixture of a powder of Mg and a powder of the metal A to an intensive mechanical grinding for several hours. It is further disclosed that absorption tests carried out on the compound of formula Mg$_{0.96}$V$_{0.04}$ (see example 2) proved to be very positive.

Figure 1:
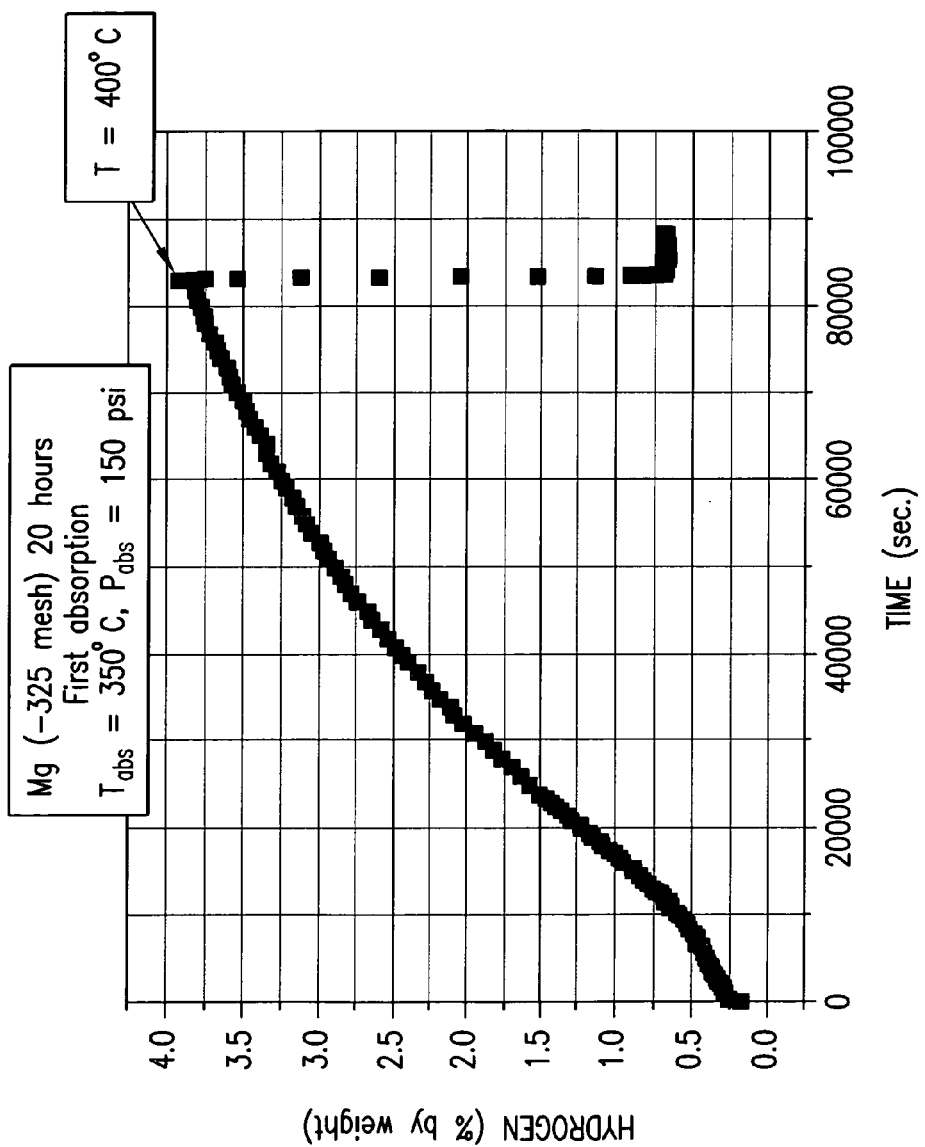
FIG. 1 is a curve giving the hydrogen absorption rate as a function of the time during a first absorption and desorption carried out at 350° C. under pressure of 150 psi on a nanocrystalline powder of Mg prepared by subjecting a powder of pure Mg (325 mesh) to an intensive mechanical grinding for 20 hours.
Figure 2:
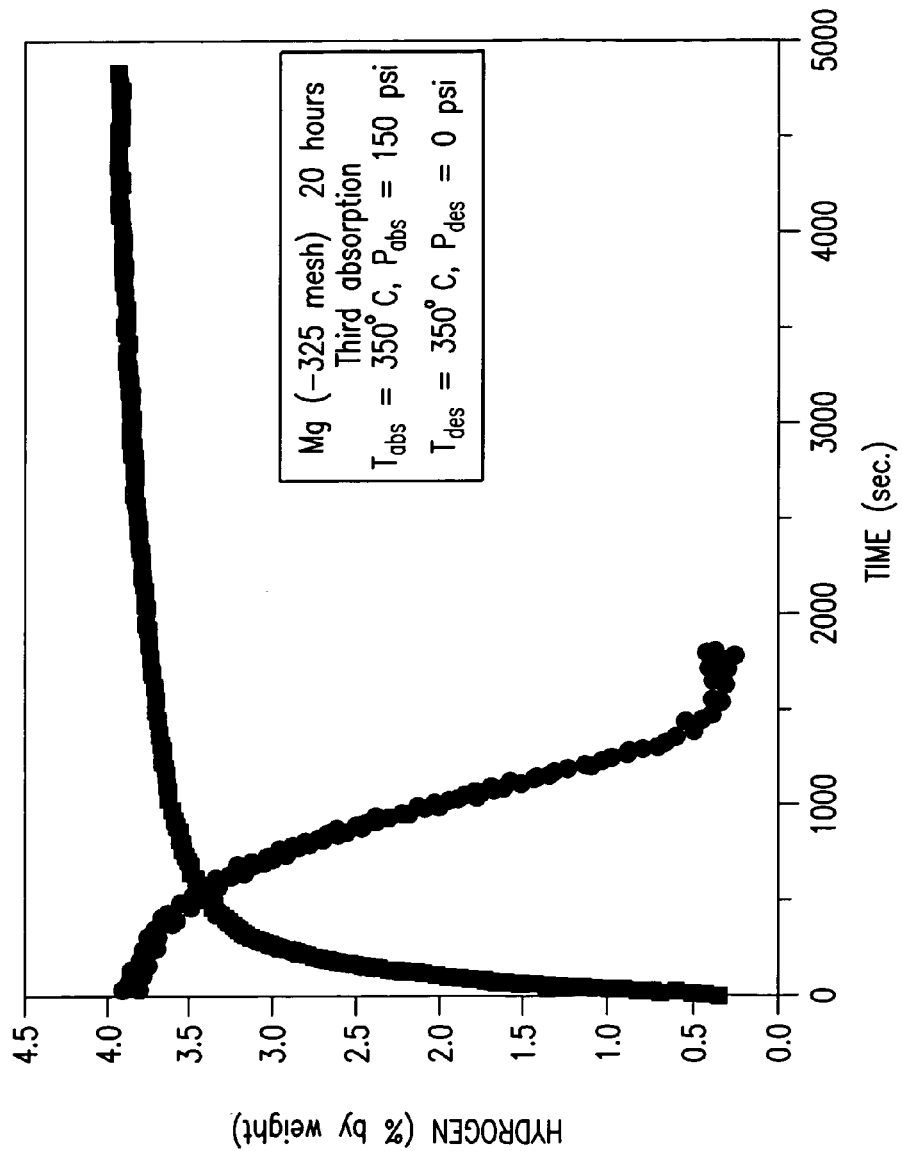
FIG. 2 is a curve similar to the one of FIG. 1 but at a different time scale, this curve being obtained during a third cycle of absorption and desorption carried out on the same nanocrystalline Mg powder under the same conditions.
Figure 3:
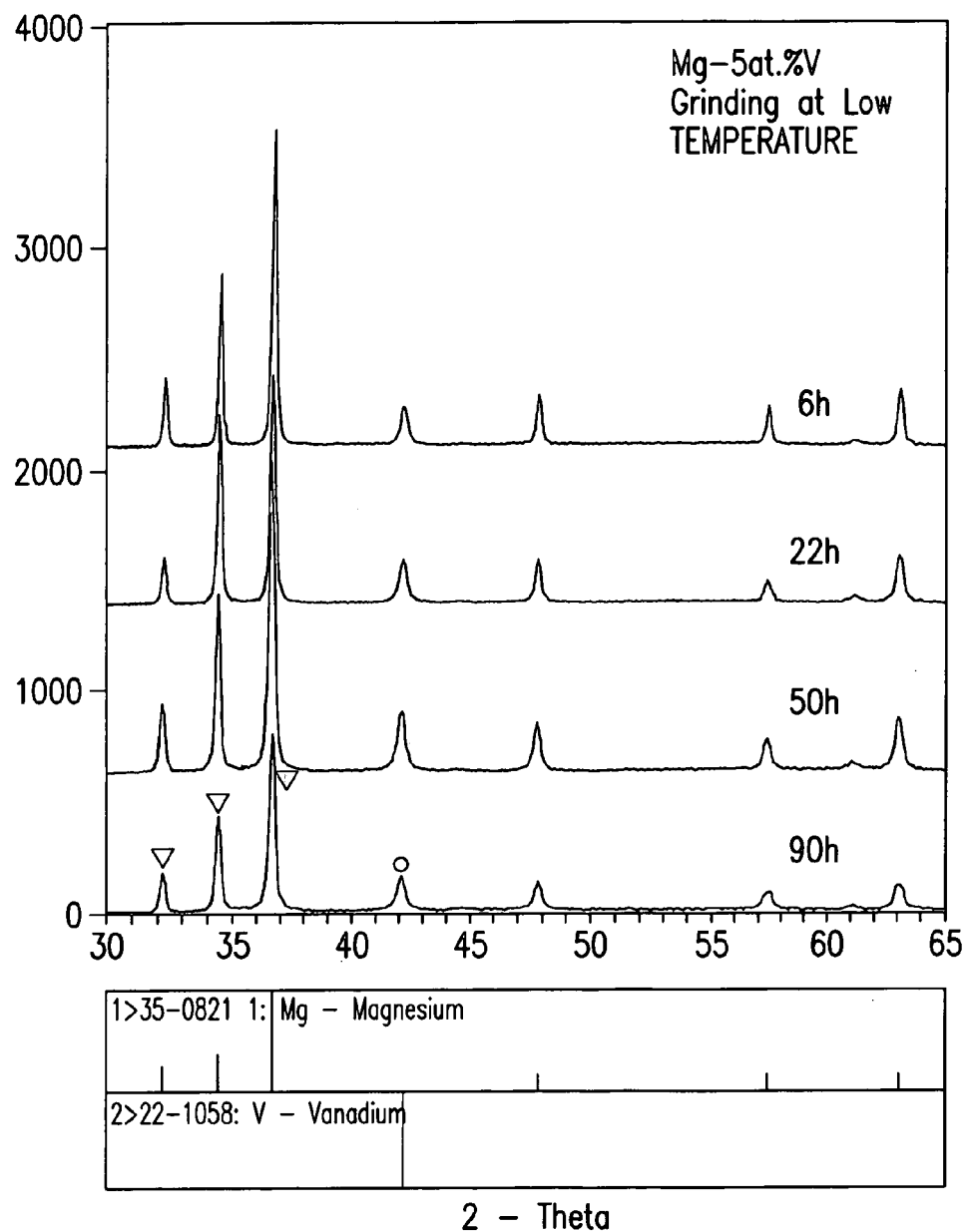
FIG. 3 is a X-ray diffraction curve showing the peaks associated to the presence of Mg(▼) and those associated with the presence of V (°) in a Mg-containing nanocomposite including 5% at. V, this nanocomposite having been prepared by subjecting powders of pure Mg (325 mesh) and V to an intensive mechanical grinding for 20 hours.
Figure 4:
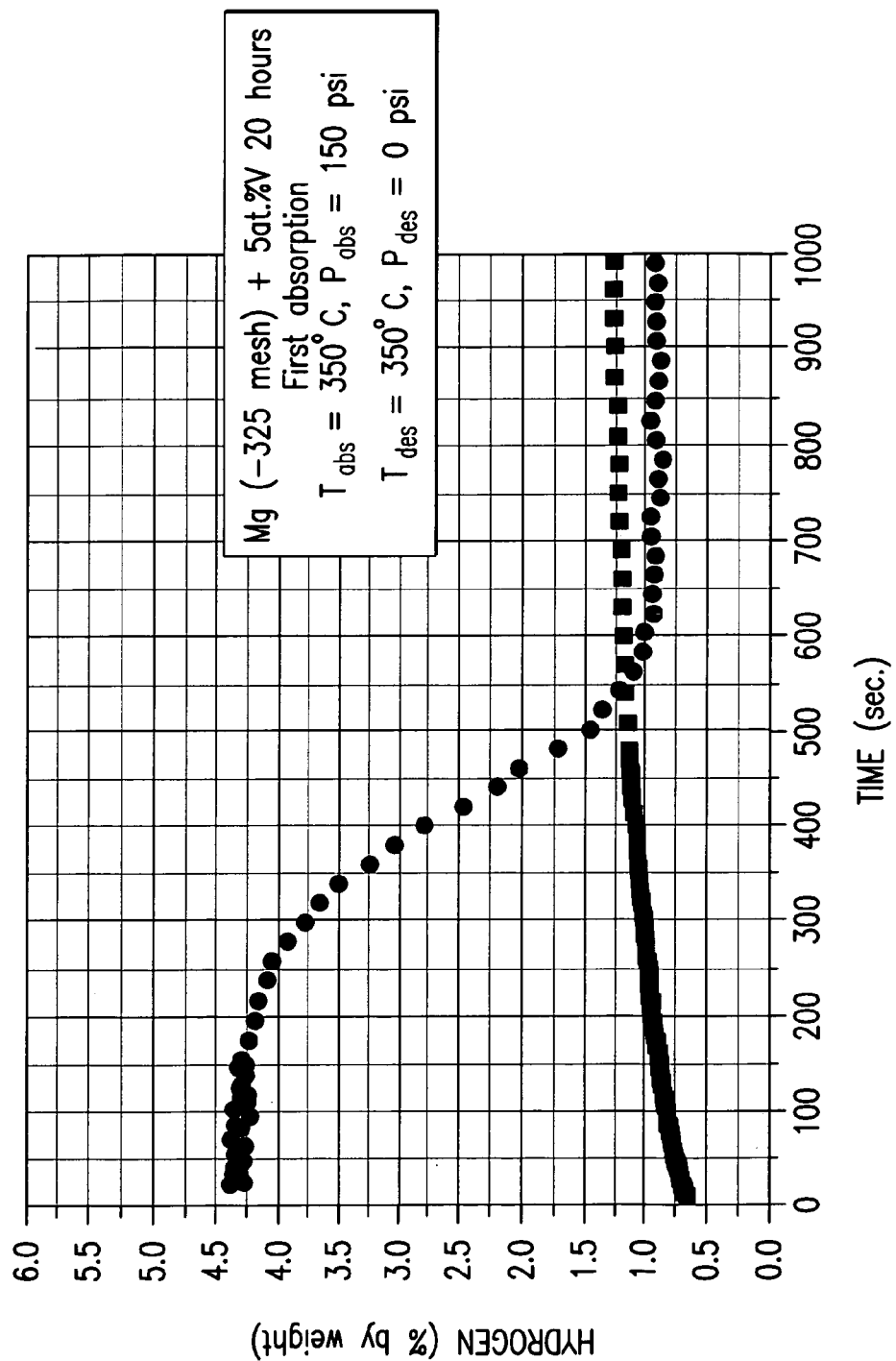
FIG. 4 is a curve giving the hydrogen absorption rate as a function of the time during a first absorption and desorption cycle carried out to 350° C. under a pressure of 150 psi on the nanocomposite whose x-ray diffraction curve is shown in FIG. 3.
Figure 5:
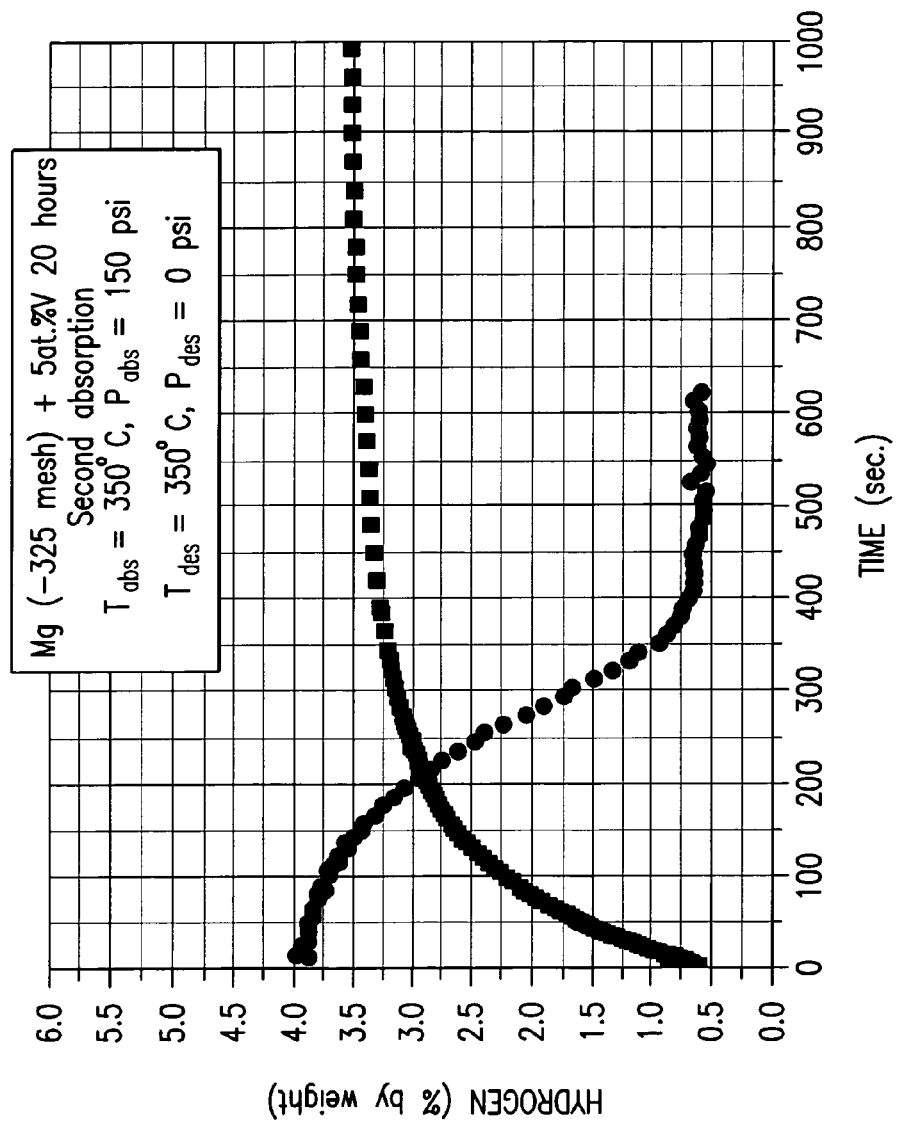
FIG. 5 is a curve giving the hydrogen absorption rate as a function of the time during a second absorption and desorption cycle carried out at 350° C. under a pressure of 150 psi on the nanocomposite whose x-ray diffraction curve is shown in FIG. 3.

FIGS. 1 to 5 of the accompanying drawings are illustrative on the absorption and desorption characteristics of the compounds disclosed in this international application No. WO 96/23906. In FIGS. 1 and 2, the compound is a nanocrystalline powder of pure Mg made of particles having an average size of 30 nm. As can be seen, very good results were obtained after the third cycle of absorption/desorption, especially regarding the kinetics. FIGS. 4 and 5 which have a time scale much shorter than the one of FIGS. 1 and 2, show that results were even better with a nanocrystalline powder of Mg containing 5% at. of V (Mg$_{0.95}$V$_{0.05}$). The diffraction curve shown in FIG. 3 shows that the nanocrystalline compound of formula Mg$_{0.95}$V$_{0.05}$ is not an alloy but a composite, since one may clearly distinguish the peaks indicative of Mg () and those indicative of V (°). However, with other metals, such as Ni or Al, a real alloy can be obtained with Mg.

International patent application No. WO 97/26214 published on Jul. 24, 1997 discloses composites in the form of mixtures of a nanocrystalline powder of a metal or alloy capable of absorbing hydrogen at high temperature, such as Mg or Mg$_2$Ni, and a nanocrystalline powder of another metal or alloy capable of absorbing hydrogen at low temperature, such as V, Nb, Na, Cs, Mn, Pd, LaNi$_5$ or FeTi. Example 7 of this application discloses the preparation of such a composite by mechanical grinding of a nanocrystalline powder of Mg with a nanocrystalline powder of FeTi. It also shows the high absorption efficiency of the composite that was so prepared.

Last of all, international patent application No. PCT/CA97/00324 filed on May 13, 1997 discloses a method for inducing desorption of the hydrogen contained in a metal hydride, consisting, inter alia, of subjecting this hydride to a mechanical treatment capable of generating sufficient energy to obtain the requested desorption. The mechanical treatment which is suggested is an intensive mechanical treatment (ball milling) sufficient to produce a great number of defects in the structure that greatly facilitates the subsequent heat-activated hydrogen desorption (see page 5, lines 12 to 15).

Based on said last premise, the Applicant has continued its research work and studied the importance of using magnesium hydride (MgH$_2$) instead of pure magnesium as starting material for the preparation of a compound as disclosed in international application No. WO 96/23906. Indeed, if intensive mechanical grinding of a metal hydride introduces a great number of strains in the structure and thus facilitates thermal desorption of hydrogen, it could reasonably be inferred that the obtained product after desorption, because of the great number of strains, will continue to have improved absorption and desorption properties.

Figure 6:
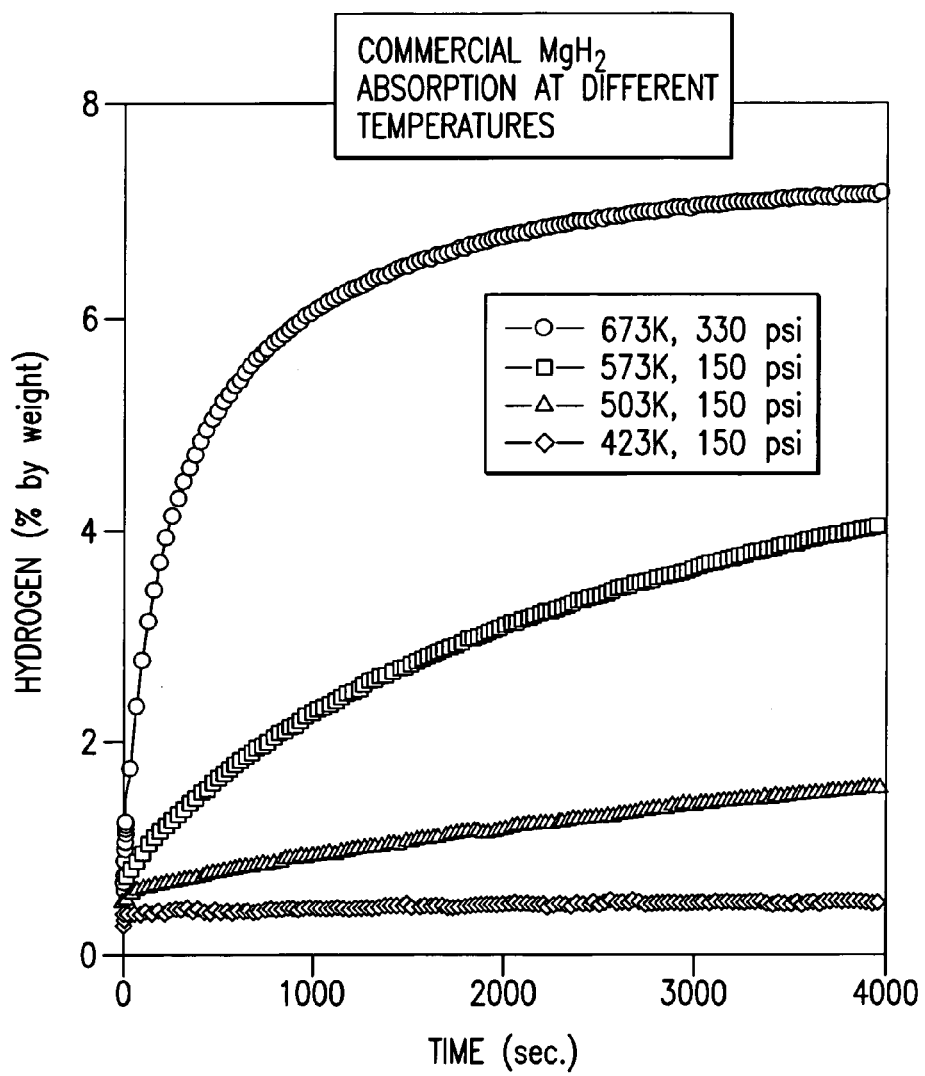
FIG. 6 is a curve giving the hydrogen absorption rate as a function of the time during the first absorption cycle carried out at various temperatures and pressures on a powder magnesium obtained by desorption of a commercial polycrystalline $MgH_2$ powder.
Figure 9:
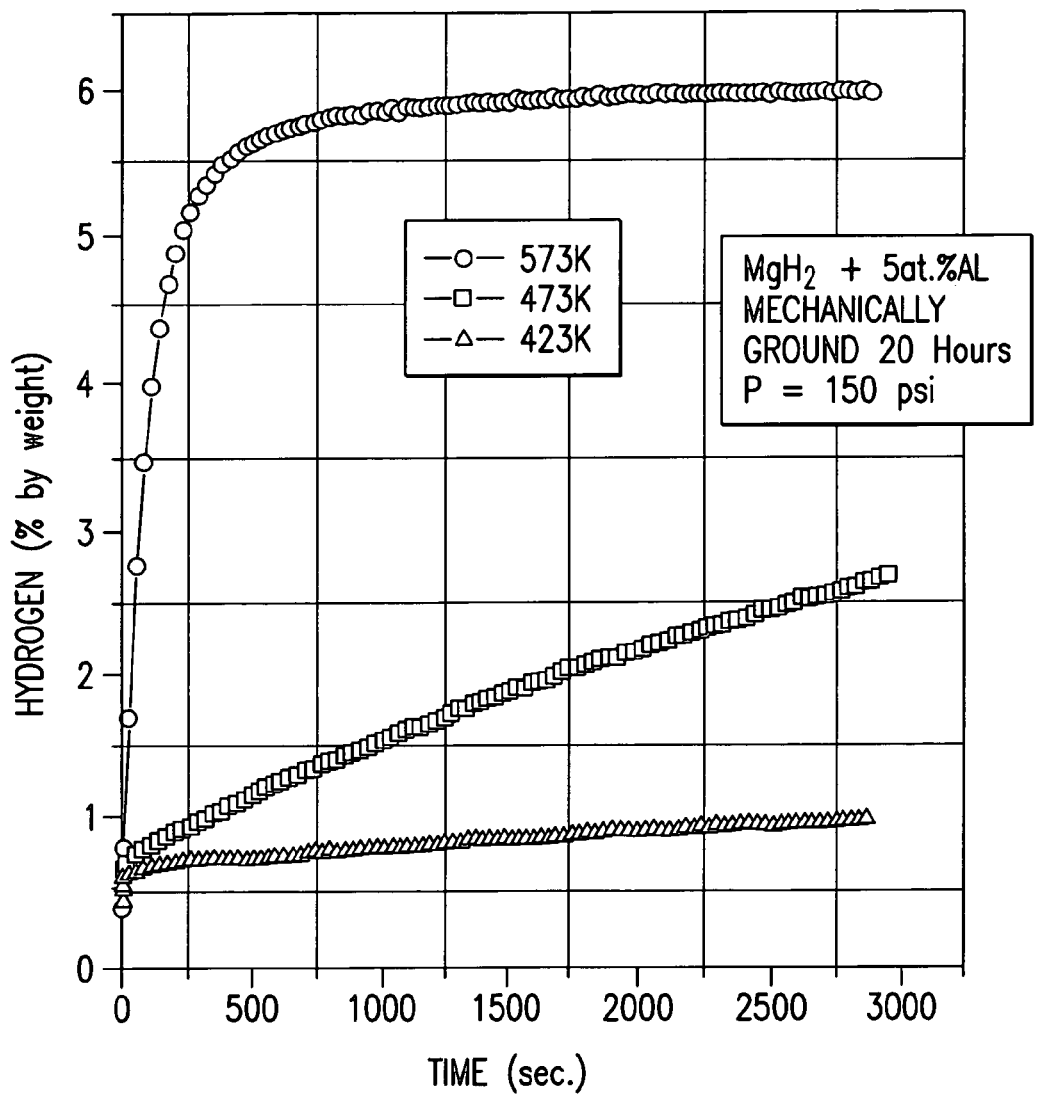
FIG. 9 is a curve similar to the one of FIG. 7, showing the hydrogen absorption rate as a function of time during a first absorption cycle carried out at various temperatures under the same pressure of 150 psi on a nanocrystalline powder of a composite of Mg and Al prepared by intensive mechanical grinding for 20 hours followed by a desorption of a mixture containing a commercial polycrystalline $MgH_2$ powder and 5% at. of an Al powder.

FIGS. 6 and 9 are illustrative of the results of the research works that were carried out on this subject.

Figure 7:
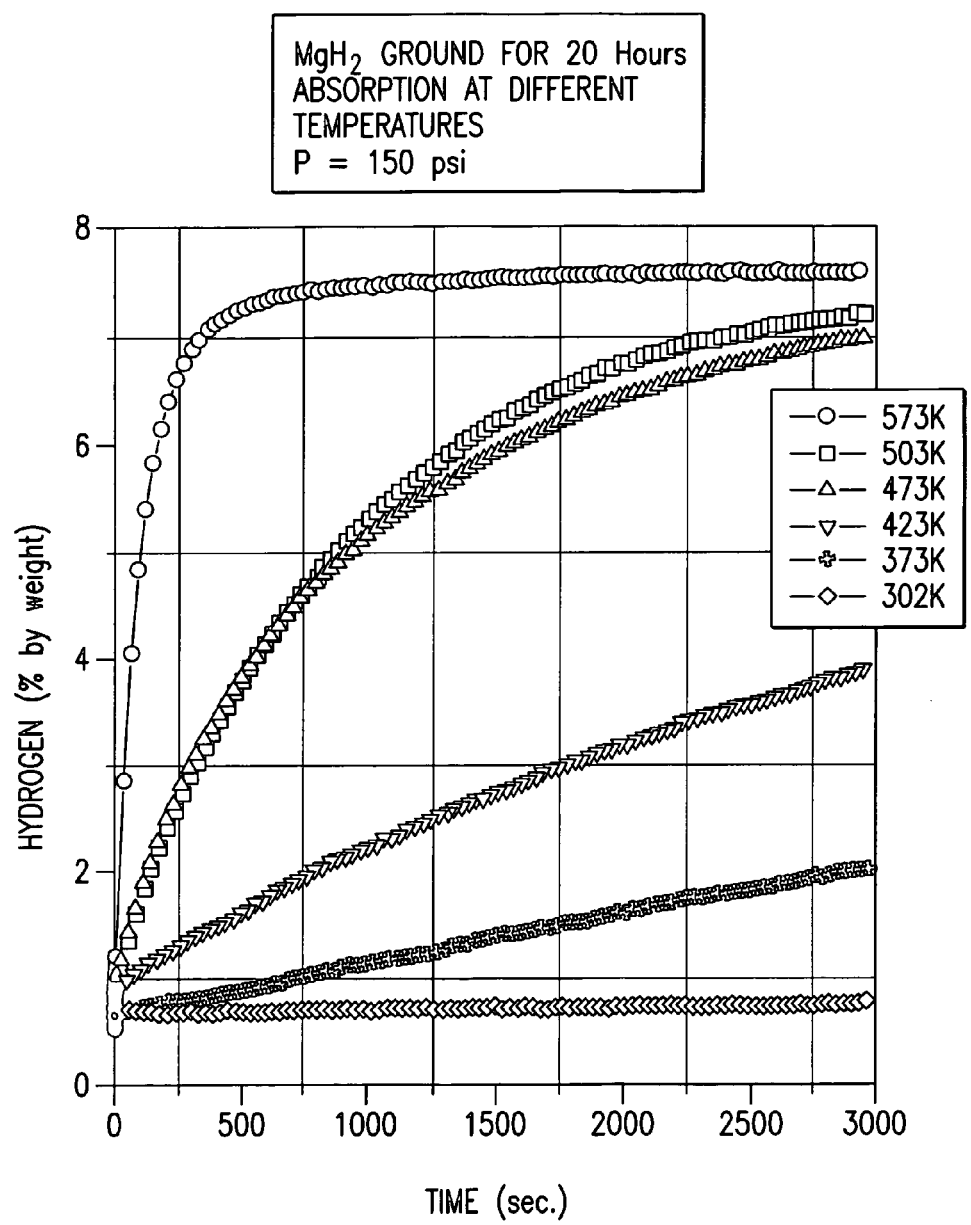
FIG. 7 is a curve similar to the one of FIG. 6 but at a different time scale, said curve giving the hydrogen absorption rate as a function of the time during a first cycle of absorption carried out at various temperatures but under the same pressure of 150 psi on a nanocrystalline Mg powder prepared by intensive mechanical grinding for 20 hours, followed by a desorption of a commercial polycrystalline $MgH_2$ powder.

As can first be noticed by comparing FIG. 6 with FIG. 7 the time scales of which are different, the absorption kinetics of a nanocrystalline Mg powder prepared by intensive mechanical grinding of a commercial MgH$_2$ powder is substantially improved as compared to the kinetics of a Mg powder prepared from the same hydride, but without grinding, whatever be the temperature. This confirms the importance that the intensive mechanical grinding has on the hydrogen absorption kinetics of a Mg powder.

As it can also be seen by comparing FIG. 7 with FIGS. 1 and 2, the kinetics and absorption capacity of a nanocrystalline Mg powder obtained by intensive mechanical grinding of a commercial MgH$_2$ powder, are better than those of a nanocrystalline Mg powder prepared by intensive mechanical grinding of a commercial Mg powder. This confirms that the use of magnesium hydride instead of pure magnesium as starting material during the grinding step permits to improve the hydrogen absorption properties, as it was, by the way, inferrable from the results already reported in international application No. WO 96/23906.

Figure 8:
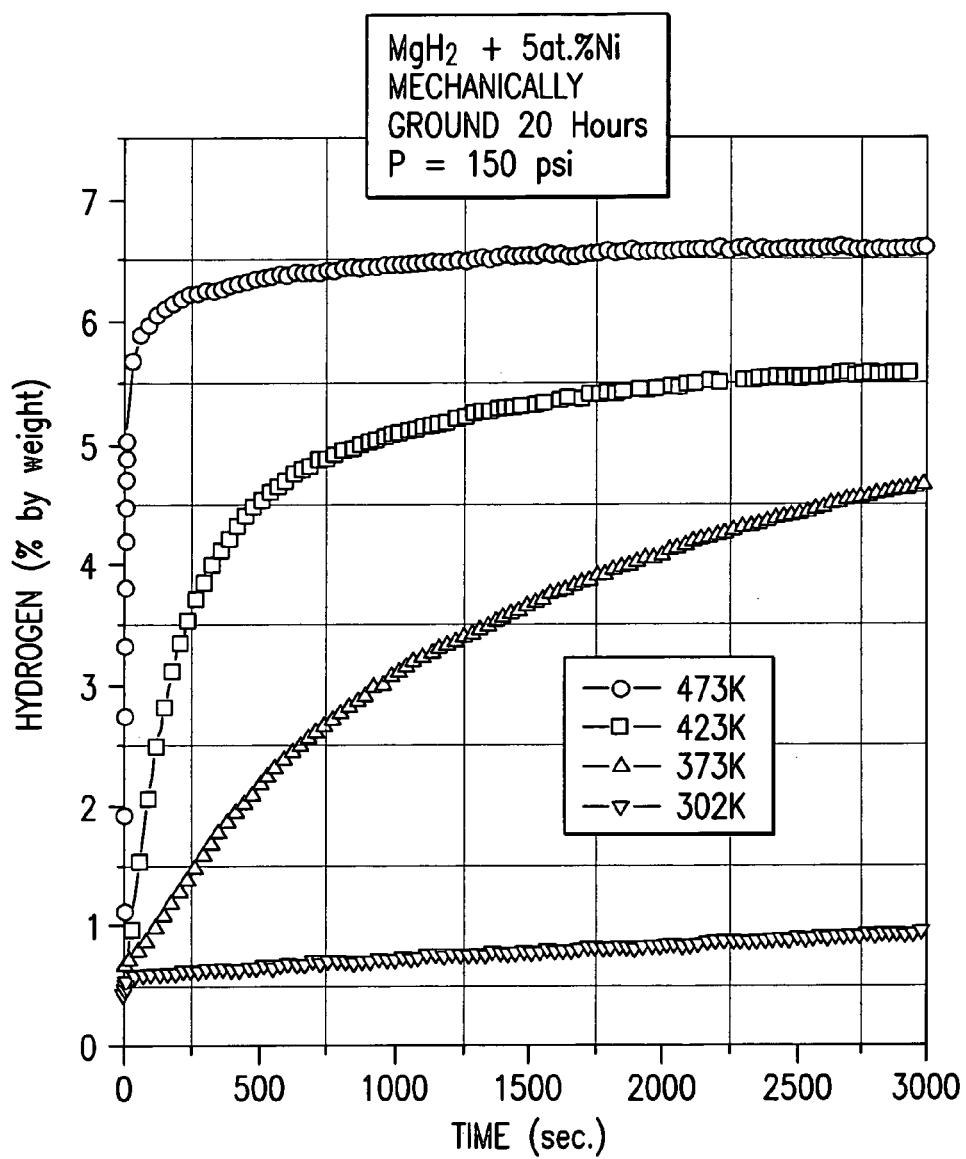
FIG. 8 is a curve similar to the one of FIG. 7, giving the hydrogen absorption rate as a function of the time during a first absorption cycle carried out at various temperatures under the same pressure of 150 psi on a nanocrystalline powder of a composite of Mg and Ni prepared by intensive mechanical grinding for hours followed by a desorption of a mixture containing a commercial polycrystalline $MgH_2$ powder as mentioned hereinabove and 5% at. of a Ni powder.

FIGS. 8 and 9 show the results obtained on nanocrystalline powders prepared by intensive mechanical grinding of a commercial MgH$_2$ powder in admixture with 5% at. of Ni powder and 5% at. of an Al powder, respectively. As it can been seen, the grinding of MgH$_2$ with Ni improves the absorption kinetics at high temperatures as compared to a grinding of MgH$_2$ alone but the kinetics at low temperature (302° F.) is substantially the same. On the contrary, in the case of the grinding of MgH$_2$ with Al, the kinetics are lower at all temperatures.

An article of FUJII H. et al published in the *Journals of Alloys and Compounds*, vol. 232 (1996) L.16 L.19, discloses the manufacture of a powder of $Mg_2NiH_{1.8}$ having a grain size of a few nanometers by intensive mechanical grinding of $Mg_2Ni$ under a hydrogen atmosphere. The obtained $Mg_2NiH_{1.8}$ powder is disclosed as being a "composite" inasmuch as the obtained grains are made of a crystalline matrix and a disordered interphase which constitute grain connections. Thus, this is not a composite as is meant within the scope of the present invention, that is a powder consisting of two types of grains of different chemical compositions. Each of these two phases consist of the same product $Mg_2Ni$ which is pure in the matrix and hydrogenated in the interphase; such explaining the measured hydrogenation capacity of 1.8 which is more lower than that of the nanocomposites according to the invention where the hydrogenation capacity of magnesium or of the magnesium-based compound must be equal to the one of the corresponding hydride ($Mg_2NiH_4$ in the case of $Mg_2Ni$). In this connection, the article specifies in its paragraph 3 that there is no trace of $Mg_2NiH_4$ even after 80 h of grinding. Moreover, the reported results are very different from those obtained within the scope of the present invention.

SUMMARY OF THE INVENTION

Following the research works reported hereinabove, it has been discovered in a surprising manner, that if (1) use is made, as starting material, of a magnesium hydride or a magnesium-based alloy hydride in combination with another element or another compound known to absorb hydrogen but not to form an alloy with magnesium during mechanical grinding, and (2) a mixture of powders of these starting materials is subjected to an intensive mechanical grinding, one may obtain a composite of nanocrystalline structure (hereinafter called "nanocomposite") having performances very superior to what could be foreseen from the results of the research works already carried out and previously reported.

Based on this discovery, a first object of the present invention is to provide a process for preparing a nanocomposite based on magnesium and another element or another compound known to absorb hydrogen and to be little miscible with magnesium and its hydride during grinding characterized in that it comprises:

a) subjecting magnesium or a magnesium-based compound known to absorb hydrogen, to a hydrogenation in order to obtain the corresponding hydride in the form of a powder;

b) mixing the so-obtained hydride powder with the other element or compound or with a hydride of this other element or compound;

c) subjecting the so-obtained mixture to an intensive mechanical grinding in order to obtain the corresponding nanocomposite in the form of a hydride; and, if required, d) subjecting the nanocomposite obtained in step c) to a hydrogen desorption.

It is worth noting that steps (a), (b) and (c) could also be combined by mechanically grinding a mixture of powders under a hydrogen pressure in order to achieve simultaneous hydrogenation of the compounds.

A second object of the invention is to provide the so-prepared, Mg-based nanocomposite, which has the advantages of being of a low cost and of having unequalled performances for storing hydrogen thanks to its microstructure (viz. the nature of the interfaces and the spatial distribution of its components) which is extremely fine and results in an incredible synergistic effect between Mg and the other element or compound.

Last of all, a third object of the invention lies in the use of the Mg-based nanocomposite that is so prepared, for storing and transporting hydrogen, in particular on board of vehicles, in metal hydride batteries or for supplying a generator or a fuel-cell.

DETAILED DESCRIPTION OF THE INVENTION

As previously summarized, the process according to the invention essentially consists in subjecting a hydride of magnesium or a magnesium-based compound to an intensive mechanical grinding with another element or compound which has the ability of absorbing hydrogen and is little miscible with Mg during grinding.

As a starting material, use can be made of a commercial pure magnesium hydride ($MgH_2$) powder, or of a powder of a hydride of a magnesium-based compound of the formula:

$$Mg_{1-x}A_x$$

in which A is at least one element selected from the group consisting of Li, Ca, Ti, V, Cr, Mn, Fe, Co, NI, Cu, Zn, Al, Y, Zr, Nb, Mo, In, Sn, O, Si, B, C, F and Be; and x is a number equal to or lower than 0.3.

Use can also be made as starting material, of a hydride of a magnesium-based compound of the formula:

$$(Mg_{2-z}Ni_{1+z})_{1-x}A_x$$

in which A and x are defined as above and z is a number comprised between −0.3 to +0.3.

The other starting material that is used must, according to the invention, be one or several other compounds which, on the one hand, are able of absorbing hydrogen and, on the other hand and essentially, are not or little miscible with Mg or its hydride during grinding. This other starting material may consist of a powder of one of the following elements: V, Ti, Fe, Co, Nb, Na, Cs, Mn, Ni, Ca, Co, Y, La, Pd, Hf, K, Rb, Rh, Ru, Zr, Be, Cr, Ge, Si, Li or their hydrides. Amongst these elements, V, Ti and Nb have proved to be particularly efficient. Instead of using vanadium(V) of high purity the cost of which is high, it may be advantageous to use a ferrovanadium compound like those of Japan Industrial Standard No. 1 whose compositions expressed in weight percent are as follows:

1) $V_{80.2}$; $Fe_{15.8}$; $Al_{3.19}$; $Si_{0.64}$; $S_{0.10}$; $P_{0.02}$

2) $V_{81.3}$; $Fe_{14.1}$; $Al_{3.27}$; $Si_{0.51}$; $O_{0.51}$; $N_{0.07}$.

The other starting material may also consist of a powder of one or more compounds selected from the group consisting of $LaNi_5$, $MmNi_5$, $ZrMn_2$, $TiMn_2$, $Mg_2Ni$ and their hydrides, the solid solutions of the formula $V_{1-y}Ti_y$ where y range from 0 to 1, $(V_{0.9}Ti_{0.1})_{0.95}Fe_{0.05}$ and the amorphous alloys of Mg and Ni.

The powder of this other material can be used as such, viz. be mixed in a suitable amount with the magnesium hydride powder or the powder of the hydride of the magnesium-based compound, and then ground simultaneously therewith. However, the powder of the other starting material may also be subjected to a preliminary hydrogenation in order to convert it to a hydride before its mixing and grinding with the magnesium hydride or the hydride of the magnesium-based compound.

Preferably, in step (b) of the process according to the invention, use is made of the other element or compound in such an amount that the atomic or molar percentage of this element or other compound in the mixture be lower than or equal to 10%. More preferably again, the atomic percentage is equal to 3 or 5%.

The intensive mechanical grinding can be carried out in any known manner. In this connection, reference can be made to the above mentioned international patent applications. Preferably, the powder can be subjected to an intensive mechanical grinding in a rod or ball milling machine of the type sold under the trademarks FRITCH and ZOZ, for a period of time ranging from 5 to 20 hours or more. Preferably also, the grinding will be carried out under an inert atmosphere. This grinding can be carried out in one step or in two steps (initial grinding of each of the powders and subsequent grinding thereof altogether). In all cases, it is essential that the obtained composite be nanocrystalline.

As previously indicated, it is also possible to combine steps (a), (b) and (c) by grinding the mixture of powders under a hydrogen atmosphere in order to simultaneously hydrogenate the compounds.

The final product that is so prepared is a nanocomposite whose grains are very small in size and intimately connected. This nanocomposite contains a great number of structural defects which facilitate desorption of hydrogen. No or almost no alloy is formed since the components Mg or its hydride and the other element or compound, such as V, Ti, Fe or Nb, are not or little miscible with each other during grinding.

The nanocomposites according to the invention outclass all the hydrogen storing materials known to the Applicant, including those disclosed in the international patent applications mentioned hereinabove. The absorption kinetics problems of Mg are almost solved, since the nanocomposites according to the invention absorb more than 3% by weight of hydrogen almost at room temperature within a few minutes. During desorption, the kinetics is extremely high, even at temperatures as low as 200, 225 and 250° C. (see FIG. 15). Finally, the cost of these nanocomposites is very low, especially in the case of the nanocomposite obtained from $MgH_2$ and 5% V, because of the small amount of V that is required to obtain good performances.

Figure 10:
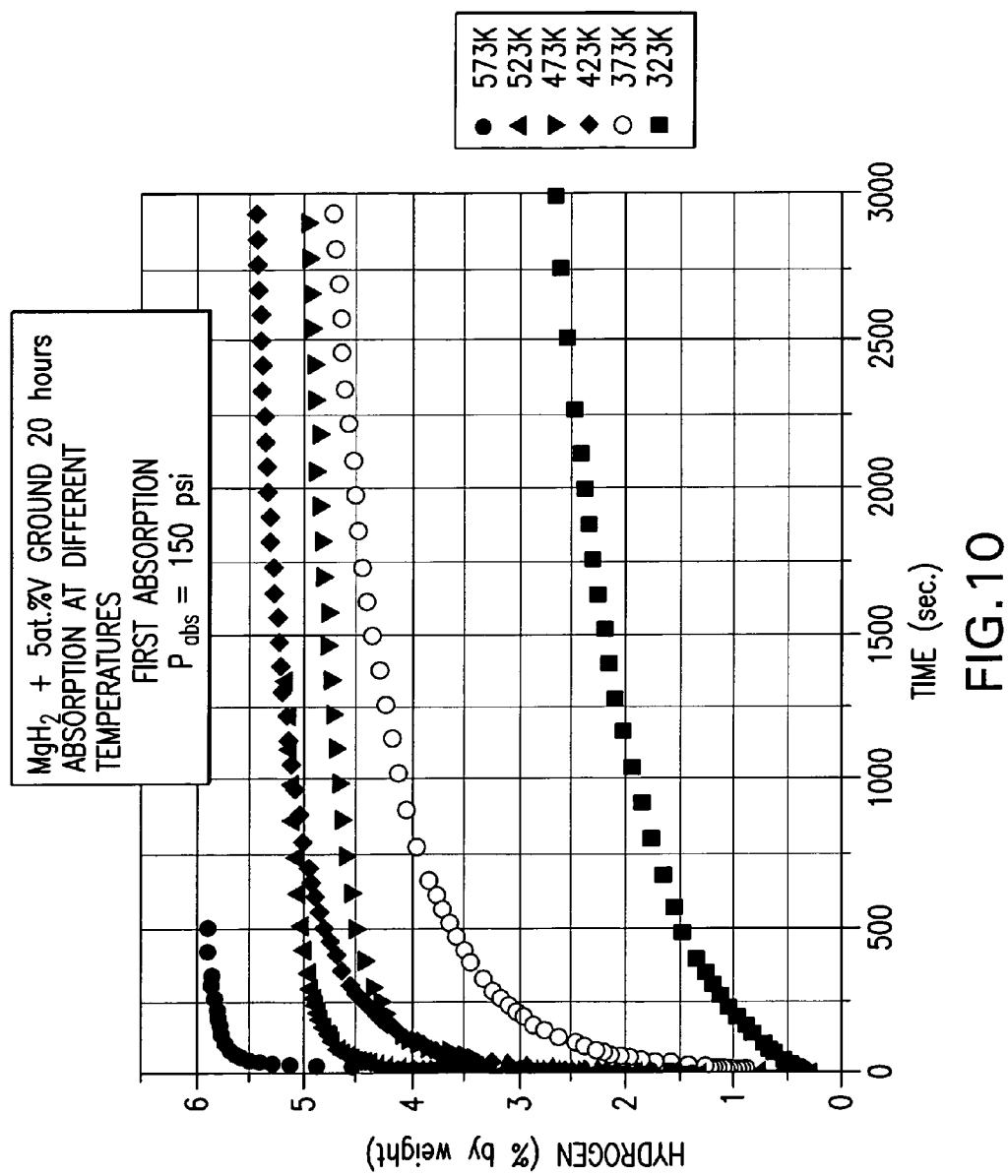
FIG. 10 is a curve giving the hydrogen absorption rate as a function of the time during a first absorption cycle carried out at various temperatures under a same pressure of 150 psi with a powder of a nanocomposite according to the invention prepared by intensive mechanical grinding for 20 hours followed by a desorption of a mixture containing a commercial polycrystalline $MgH_2$ powder and 5% of a powder of V.
Figure 11:
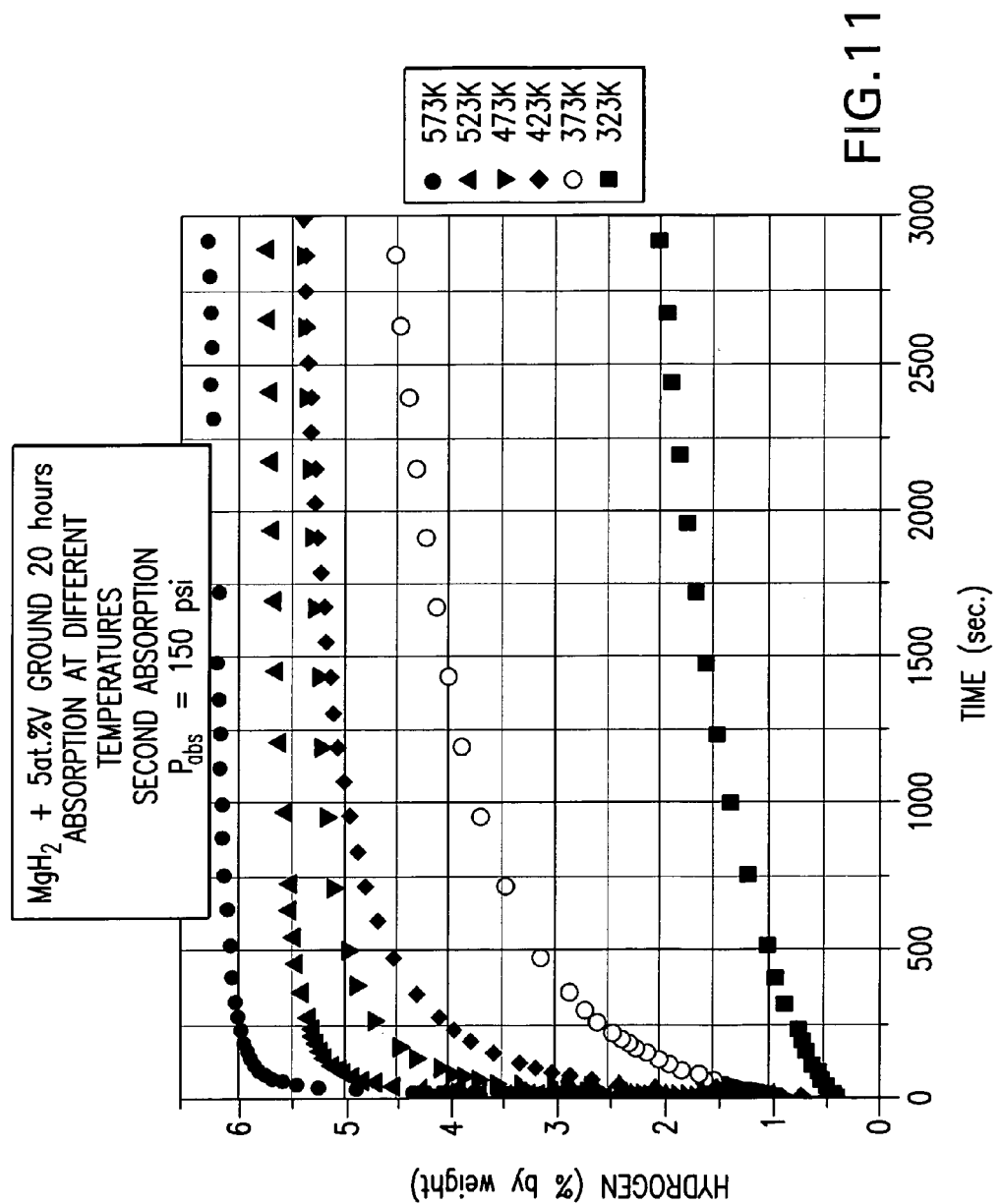
FIG. 11 is a curve giving the hydrogen absorption rate as a function of the time during a second absorption cycle carried out at various temperatures under a same pressure of 150 psi with a powder of a nanocomposite according to the invention prepared by intensive mechanical grinding for 20 hours followed by a desorption of a mixture containing a commercial polycrystalline $MgH_2$ powder and 5% of a powder of V.
Figure 12:
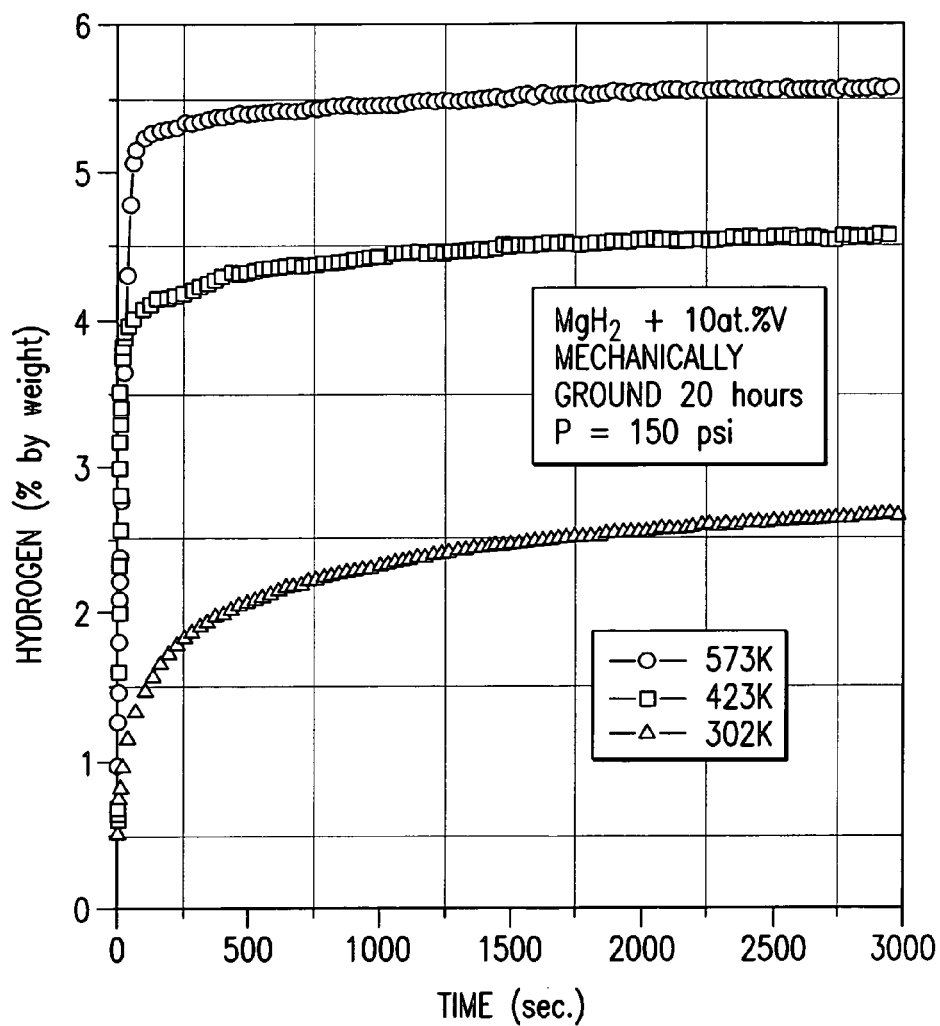
FIG. 12 is a curve similar to the one of FIG. 7, giving the hydrogen absorption rate as a function of the time during a first absorption cycle carried out at various temperatures under the same pressure of 150 psi on powder of a nanocomposite of Mg and V according to the invention prepared by intensive mechanical grinding for 20 hours followed by the desorption of a mixture containing a commercial polycrystalline $Mg_2H_2$ and 10% at. of a powder of V.

FIGS. 10 and 11 show absorption curves obtained on a nanocomposite prepared by intensive mechanical grinding for 20 hours of a commercial $MgH_2$ powder (325 mesh) mixed with 5 at. of a powder of pure V. These curves should be compared with those given in FIGS. 7 to 9, which give the results of absorption cycles carried out under the same temperature and absorption pressure (150 psi).

As can be noticed, the nanocomposites according to the invention have a hydrogen absorption kinetics much faster than the one of magnesium and the one of the alloy of magnesium and aluminium prepared with the very same technique (that is from a powder of Mg hydride). In fact, even at 29° C. (302° K.), the nanocomposites according to the invention are able of absorbing hydrogen, whereas the products reported in FIGS. 7 to 9 are not. At temperatures as low as 150° C. (423° K.), they can also absorb hydrogen in a quasi-instantaneous manner, whereas the absorption is extremely slow in the case of the products of FIGS. 7 to 9.

When comparing $MgH_2$+V (FIG. 10) and $MgH_2$+Ni (FIG. 8), the kinetics are similar at high temperature but, in contrast at low temperature, $MgH_2$+V is much more efficient.

This surprising increase in the absorption kinetics may perhaps be explained by the fact that the grinding of the Mg hydride with another element or compound known to absorb hydrogen and to be very few miscible with $MgH_2$ causes a destabilisation of the magnesium hydride and creates large surfaces and particular "activated" interfaces between the grains of the composite, which allow easy and fast hydrogen transportation.

A comparison between FIGS. 10 and 11 show that there is no advantage in substantially increasing the amount of V in the nanocomposite. In fact, the results are obtained with 10% at. of V are almost identical to those obtained with 5% at. of V. The nanocomposite being heavier in the first case because of a higher percentage of V, the percentage of hydrogen absorbed with respect to the total weight of the nanocomposite is lower but the amount of absorbed hydrogen remains, in practice, substantially the same.

Figure 13:
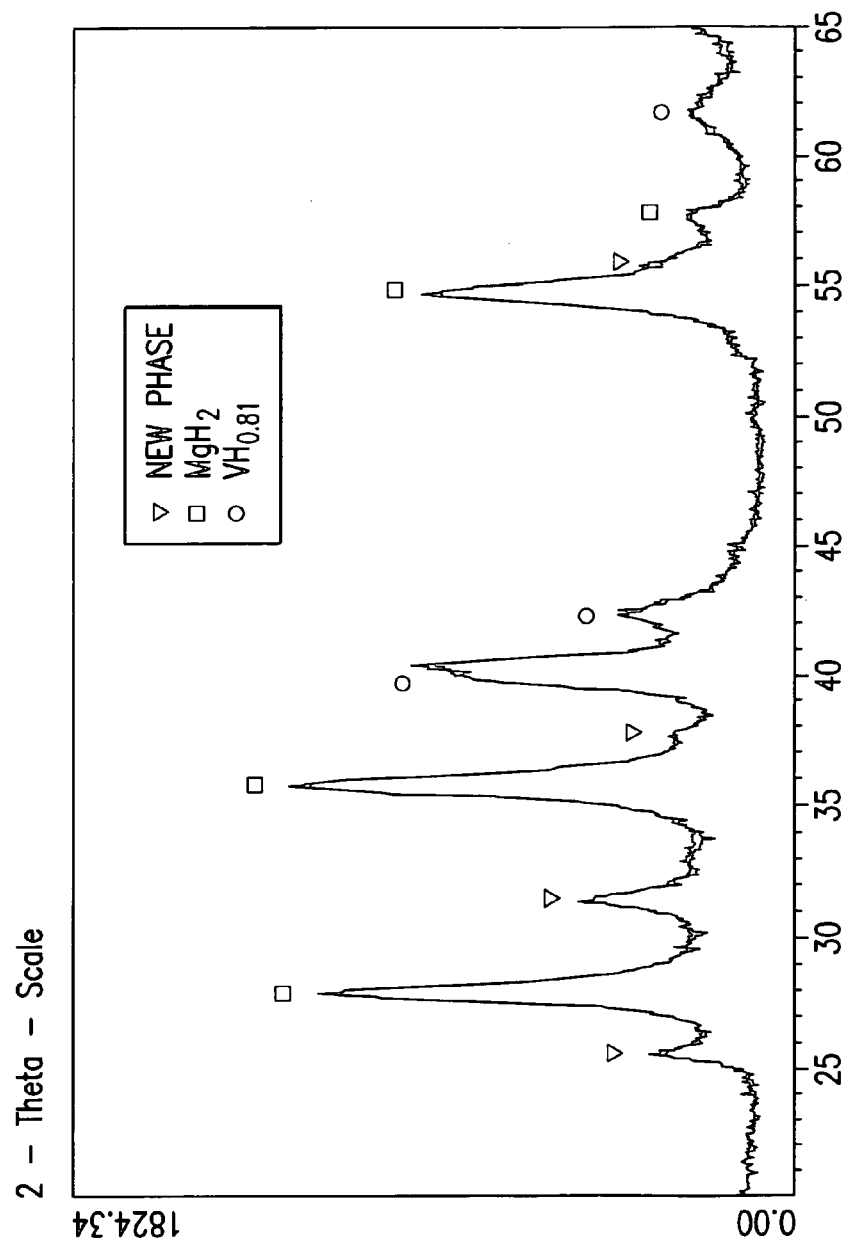
FIG. 13 is an X-ray diffraction curve showing the peaks indicative of the simultaneous presence of $MgH_2$, VH and a new phase ($\gamma$ $MgH_2$) a nanocrystalline powder prepared by intensive mechanical grinding for 20 hours of a mixture containing a commercial polycrystalline $MgH_2$ powder and 5% at. of a powder of V.
Figure 14:
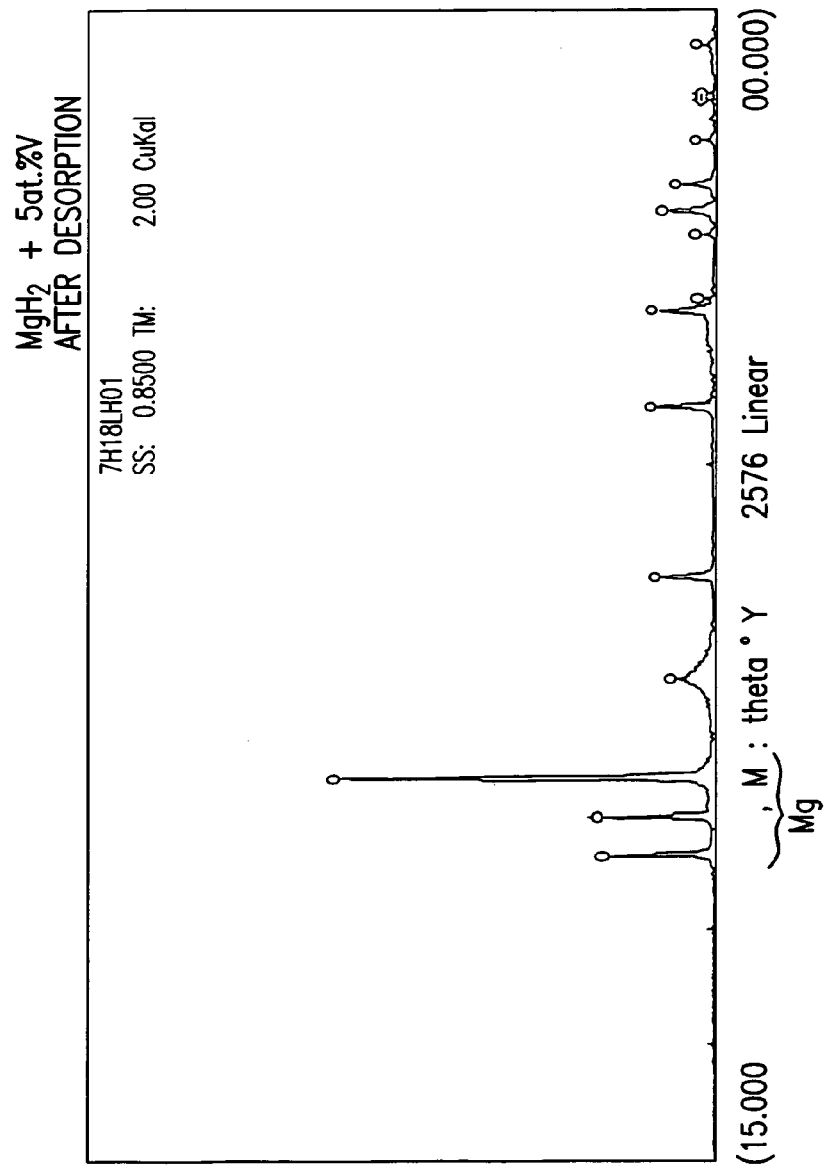
FIG. 14 is a diffraction curve similar to the one of FIG. 13, showing the peaks indicative of the presence of Mg and V in the nanocrystalline powder used during the absorption test reported in FIG. 13, after desorption.

The diffraction curves given FIGS. 13 and 14 show that, during grinding of a powder of $MgH_2$ with a powder of V, peaks of $VH_{0.81}$ are formed and a transfer is then achieved of part of the hydrogen stored in the $MgH_2$ into the vanadium (see FIG. 13). Moreover, the X-ray diffraction spectrum given in FIG. 13 shows that there is formation of a new metastable phase ($\gamma$ $MgH_2$) which has never been observed so far during the mechanical grinding of hydrogen storing materials and which could perhaps explain the exceptional performances of the new nanocrystalline composites for storing hydrogen. After desorption, the obtained diffraction curve (see FIG. 14) is similar to the one shown in FIG. 3, but the transfer of hydrogen occurring during grinding by using a Mg hydride instead of pure magnesium as starting material obviously leads to the formation of activated interfaces, as is proved by the absorption curves.

A comparison between FIGS. 10 and 11 show also that the results obtained during the first absorption cycle are very similar to those obtained during the second absorption cycle, whatever be the temperatures. This is to be compared with the results reported in FIGS. 1 and 2, where the third absorption was much faster and more efficient than the first one. This again confirms that the process according to the invention leads to an immediate activation of the interfaces of the nanocomposite and, accordingly, to a better absorption capacity.

Figure 15:
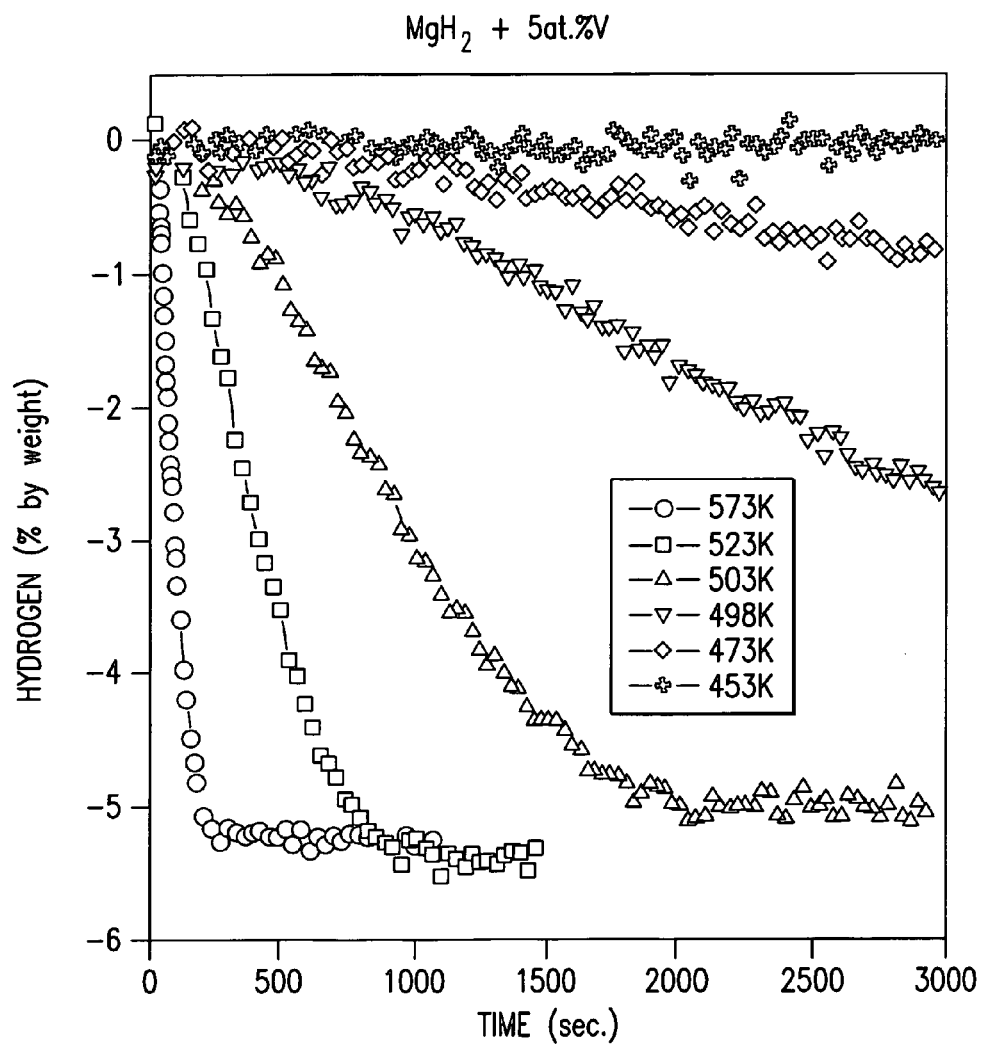
FIG. 15 is a curve giving the hydrogen desorption rate as a function of the time during a first cycle of desorption carried out at various temperatures under a same pressure of 0 psi on a powder of a nanocomposite according to the invention prepared by intensive mechanical grinding for 20 hours followed by a desorption of a mixture containing a commercial polycrystalline $MgH_2$ powder and 5% at. of a powder of V.

FIG. 15 shows desorption curves obtained during a first cycle of absorption carried out at various temperatures on a nanocomposite prepared from $MgH_2$ and 5% at. of V (that is the very same nanocomposite as used for the tests reported in FIGS. 10 and 11). As can be noticed, this curve shows that the desorption is initiated at 475° K. (200° C.). This curve also shows that the desorption is almost competed after 1,000 seconds at 523° K. (250° C.), which is extraordinary for a compound/consisting most essentially of pure Mg. Indeed, it is worth reminding that pure Mg (viz. the polycrystalline $MgH_2$) requires temperatures of about 350° C. for desorbing hydrogen in 1,500 seconds (see FIG. 2).

Figure 16:
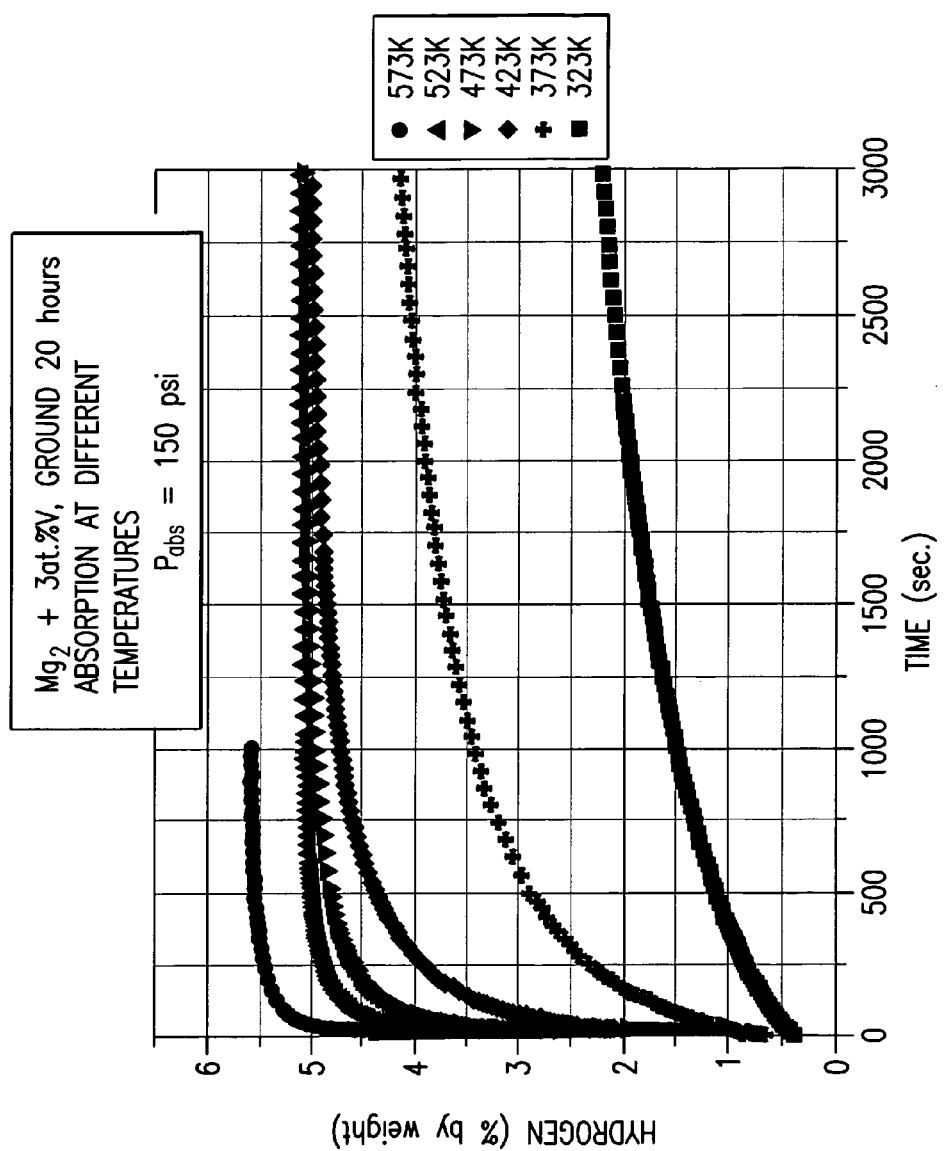
FIG. 16 is a curve similar to the one shown in FIG. 10, except that the nanocomposite that was used for the measurements contained 3% at. of V, only.

FIG. 16 is similar to FIG. 10, except that the nanocomposite that was used, was prepared by intensive mechanical grinding of $MgH_2$ with 3% at. of V only. As can be seen, the results are, once again, excellent. Thus, it seems that what is important is not the amount of V, but rather its presence in a sufficient amount to activate the surfaces and interfaces between the grains.

Figure 17:
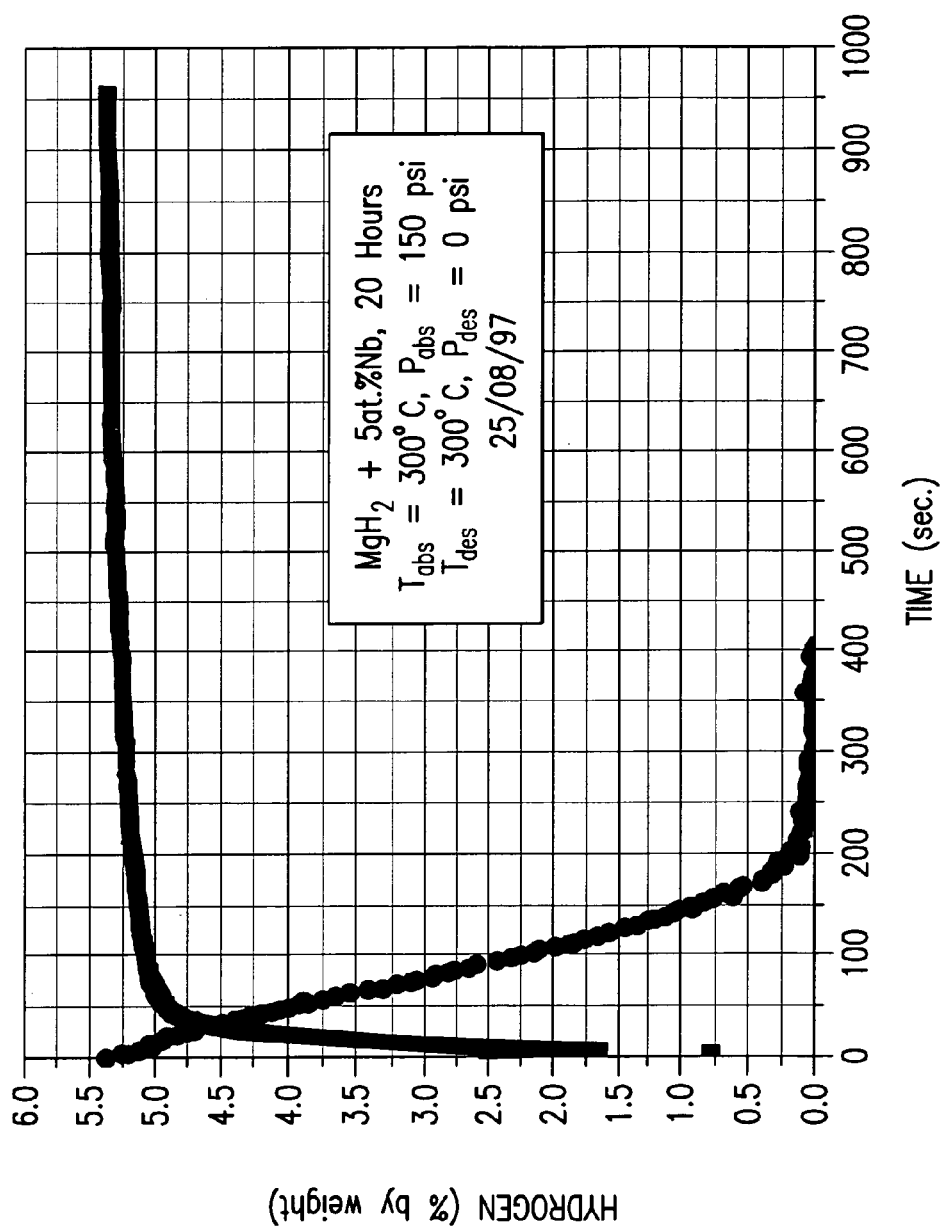
FIG. 17 is a curve giving the hydrogen absorption and desorption rate as a function of the time during a first absorption and desorption cycle carried out at 300° C. under a pressure of 150 psi, on a powder of a nanocomposite according to the invention prepared by intensive mechanical grinding for 20 hours followed by desorption of a mixture containing a commercial polycrystalline MgH$_2$ powder and 5% at of a powder of Nb.
Figure 18:
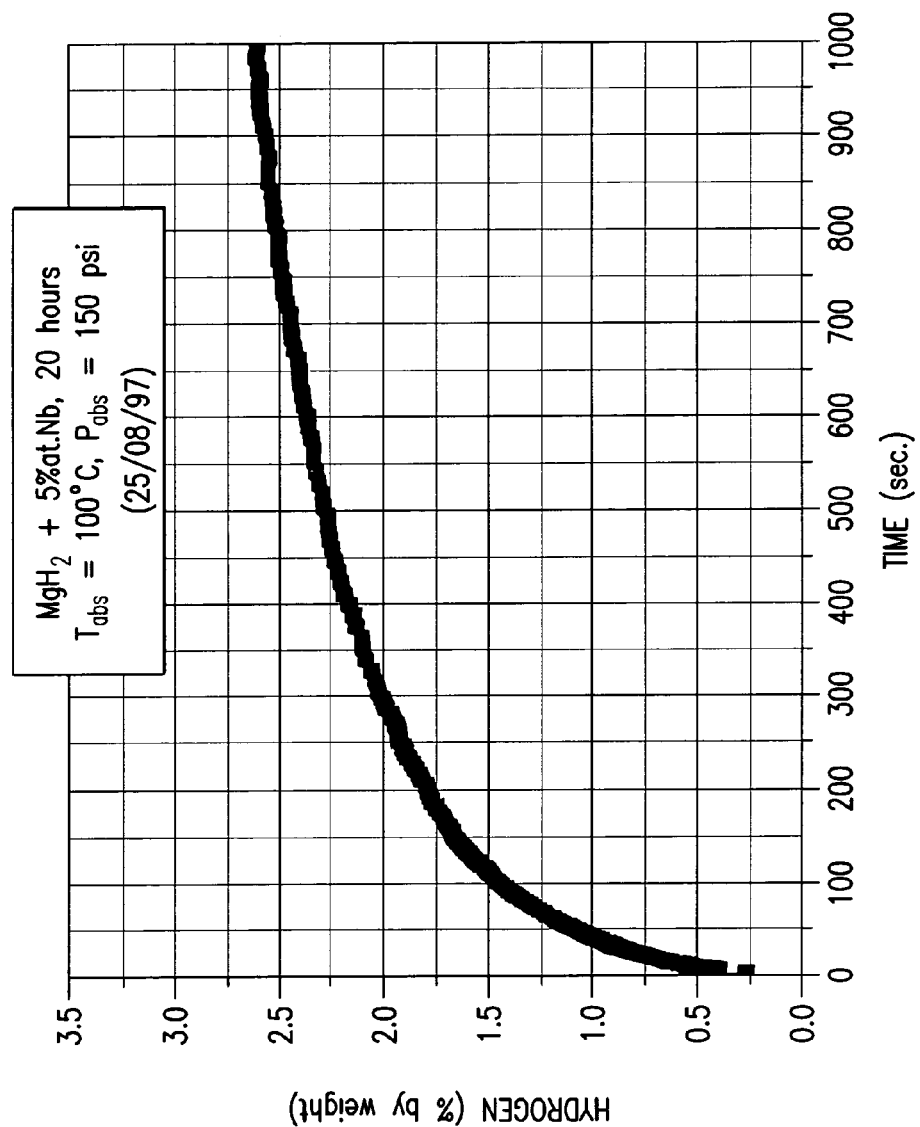
FIG. 18 is a curve giving the hydrogen absorption and desorption rate as function of the time during a first absorption cycle carried out at 100° C. under a pressure of 150 psi on a powder of a nanocomposite mechanical grinding for 20 hours followed by a desorption of a mixture containing a commercial polycrystalline MgH$_2$ powder and 5% at. of a powder of Nb.

FIGS. 17 and 18 show absorption curves obtained at 300° C. and 100° C., respectively, under a pressure of 150 psi with a nanocomposite according to the invention prepared by intensive mechanical grinding of $MgH_2$ with 5% at. of Nb. Nb is also known to absorb hydrogen and to be little miscible with $MgH_2$ upon grinding. As can be noticed, the results that were so obtained are very comparable with those reported for the nanocomposites containing V. Thus, the invention can reasonably be generalized to the use of other elements or compounds having the same properties as those mentioned hereinabove.

Figure 19:
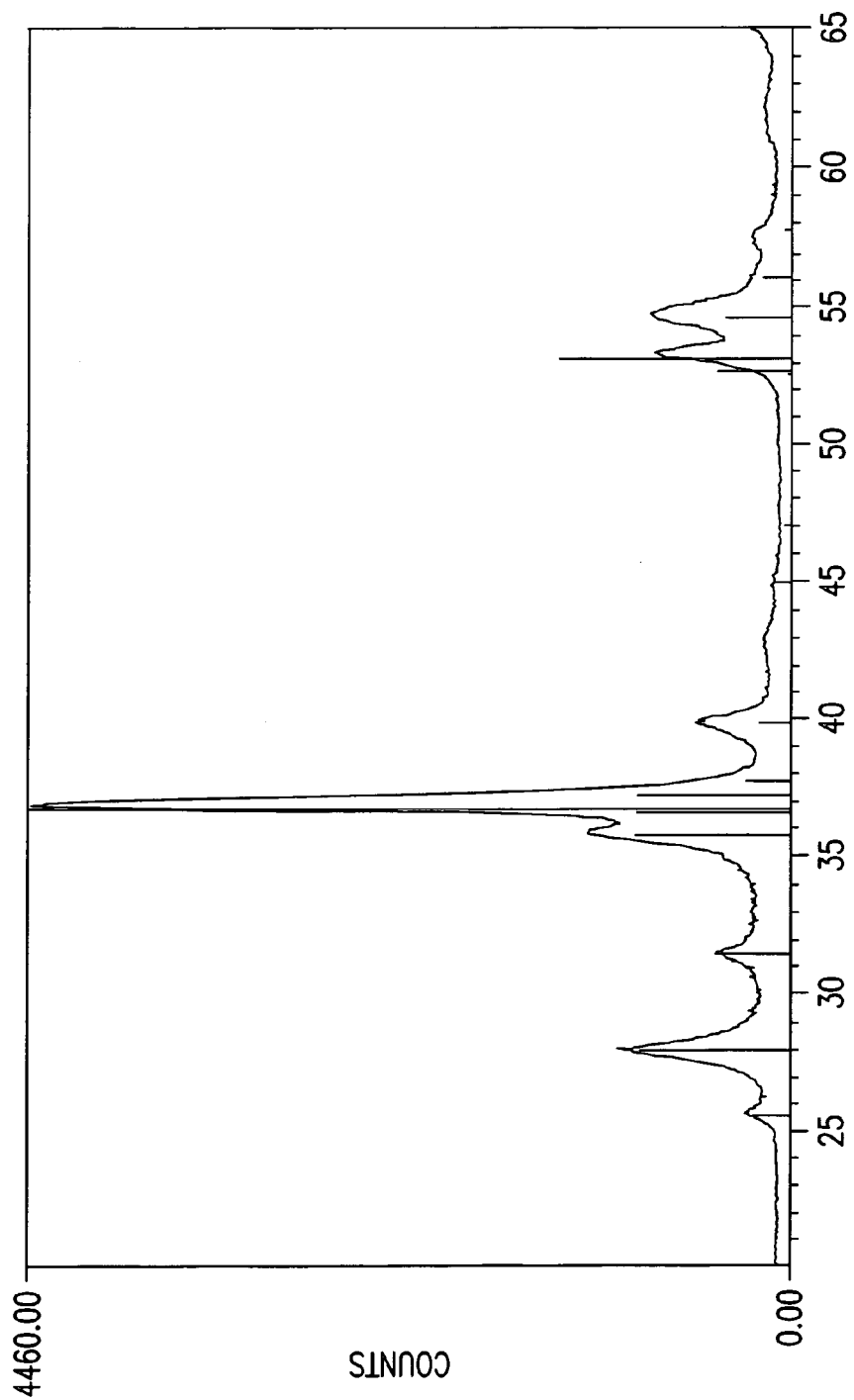
FIG. 19 is a X-ray diffraction curve showing peaks indicative of the simultaneous presence of MgH$_2$, NbH and a new phase (γ MgH$_2$) in a nanocrystalline powder obtained after intensive mechanical grinding for 20 hours of a mixture containing a commercial polycrystalline MgH$_2$ powder and 5% at. of a powder of Nb.

FIG. 19 is a diffraction curve obtained with the ground product obtained for the absorption tests reported in FIGS. 17 and 18. As can be noticed, this curve also shows that there has been a transfer of hydrogen from $MgH_2$ to Nb. The presence of a new metastable phase ($\gamma$ $MgH_2$) is also identified.

Figure 20:
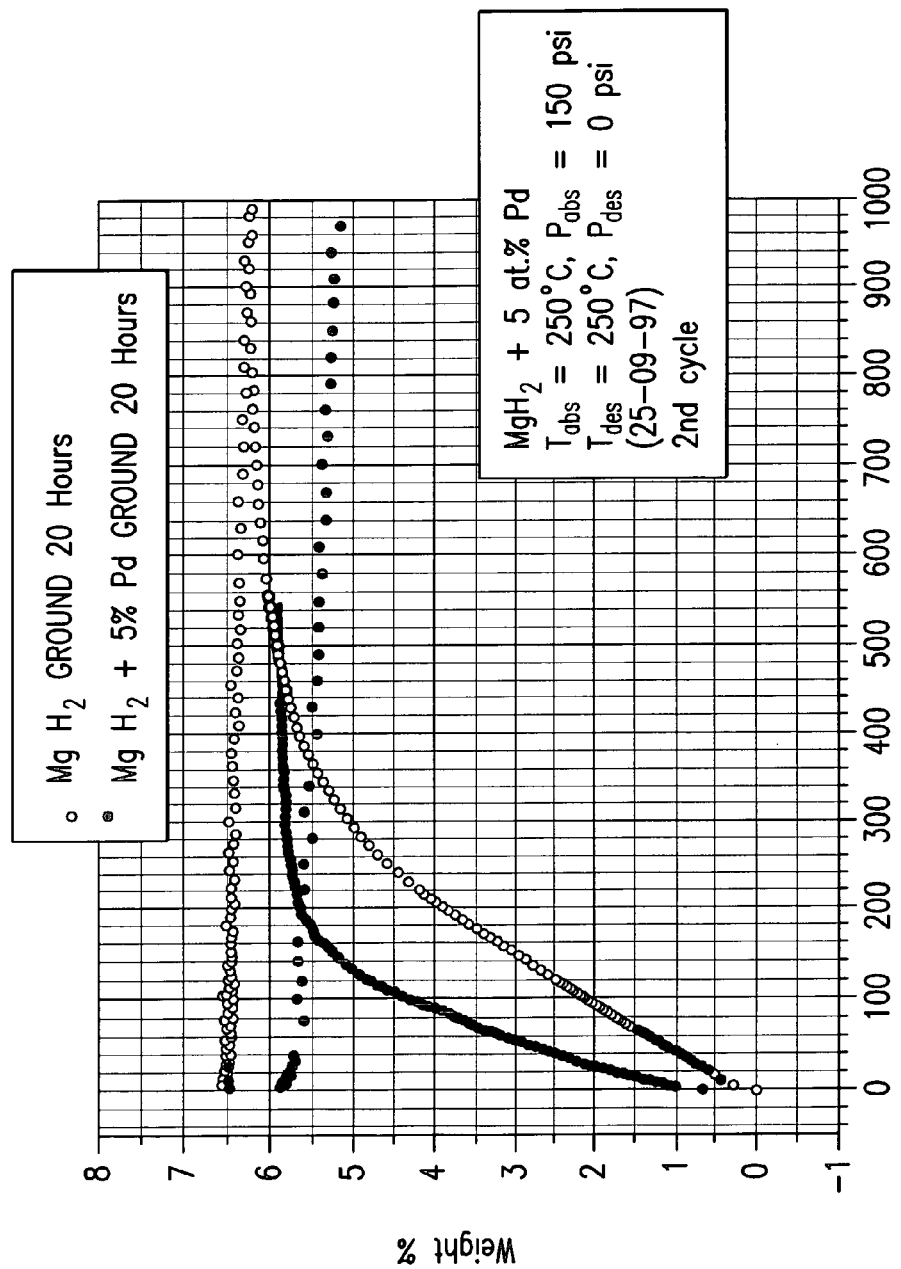
FIG. 20 is a curve giving the absorption and desorption rates as a function of the time during a second cycle of absorption carried out at 250° C. under a pressure of 150 psi and of desorption carried out at the same temperature under a pressure of 0 psi, the measurements being carried on a powder of a nanocomposite according to the invention prepared by intensive mechanical grinding for 20 hours followed by a desorption of a commercial polycrystalline MgH$_2$ powder and 5% at. of a Pd powder and, by way of comparison, on a nanocrystalline powder prepared by intensive mechanical grinding for 20 hours of the same MgH$_2$ polycrystalline powder, but without Pd.

FIG. 20 shows absorption and desorption curves obtained at 250° C. under a pressure of 150 psi with a nanocomposite according to the invention obtained by intensive mechanical grinding of $MgH_2$ with 5% at. of Pd, which is an element known to catalyst the absorption of hydrogen. As can be noticed, there is a beneficial effect (viz. a much faster absorption) when use is made of Pd. The effect is lower than with V or Nb but nevertheless detectable.

Figure 21:
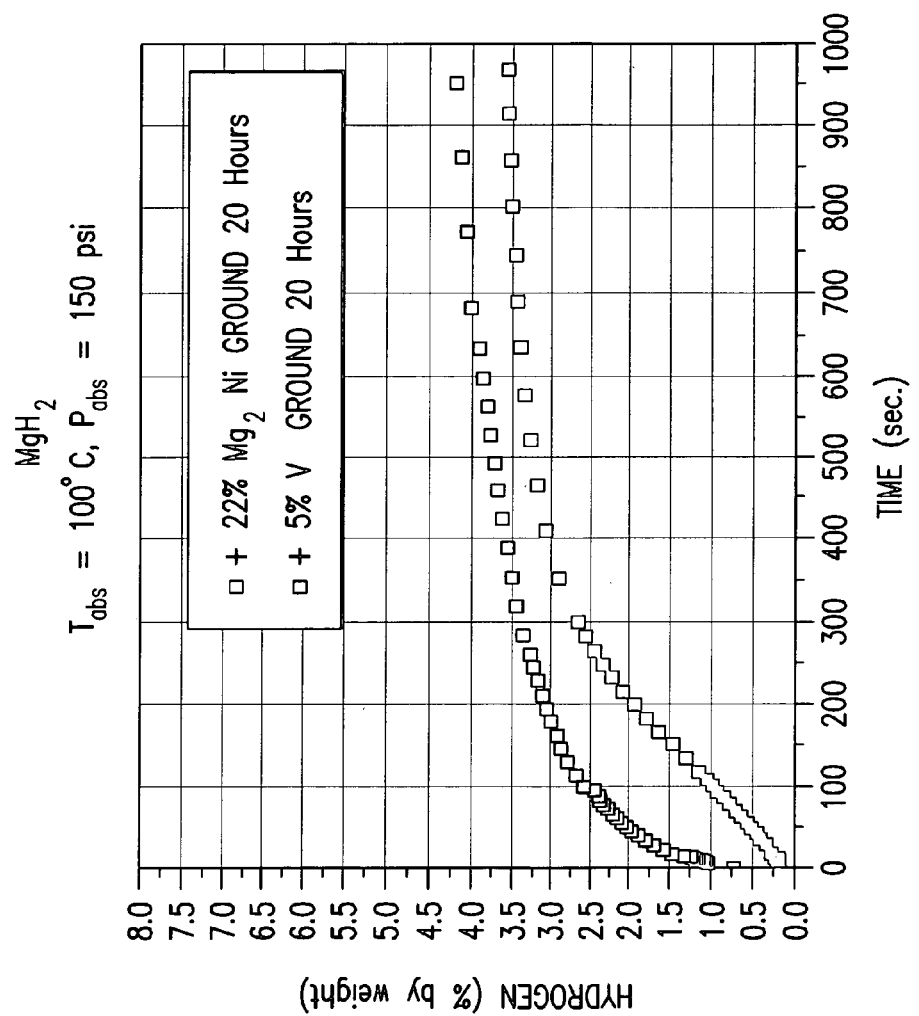
FIG. 21 is a curve giving, by way of comparison, the hydrogen absorption rate measured as a function of the time during a first cycle of absorption carried out at 100° C. under the pressure of 150 psi with powders of nanocomposites according to the invention prepared by intensive mechanical grinding for 20 hours followed by a desorption of mixtures containing a commercial polycrystalline MgH$_2$ powder in admixture and 5% at. of a powder of V and 22% at. of a powder of Mg$_2$Ni respectively.

FIG. 21 shows that a nanocomposite according to the invention prepared by intensive mechanical grinding of $MgH_2$ with a compound known to absorb hydrogen such as $Mg_2Ni$, also gives a good performance. This performance is not as good as the one obtained with a mixture of $MgH_2$ and V, but it nevertheless exists. As a matter of fact, the obtained result is, in all cases, better than the one obtained at 100° C. with ground pure $MgH_2$.

Figure 22:
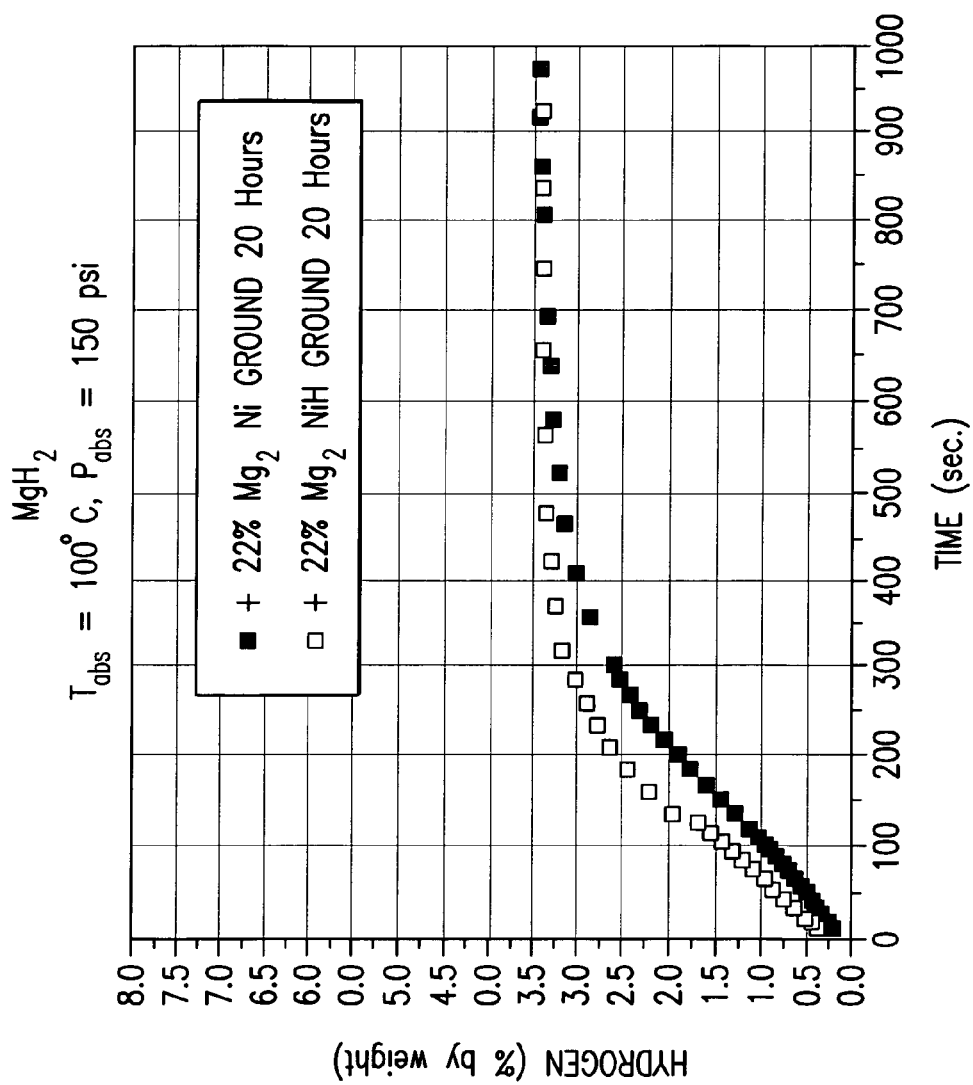
FIG. 22 is a curve similar to the one of FIG. 21, except that the nanocomposites according to the invention were prepared from a commercial polycrystalline MgH$_2$ powder in admixture with 22% at. of a powder of Mg$_2$Ni and 22% at. of a powder of Mg$_2$NiH$_4$, respectively.

FIG. 22 is to be compared with FIG. 21. It shows that a nanocomposite according to the invention prepared by intensive mechanical grinding of $MgH_2$ with $Mg_2NiH_4$ is very slightly better than the one obtained with $MgNi_2$. However, the difference is very small.

Figure 23:
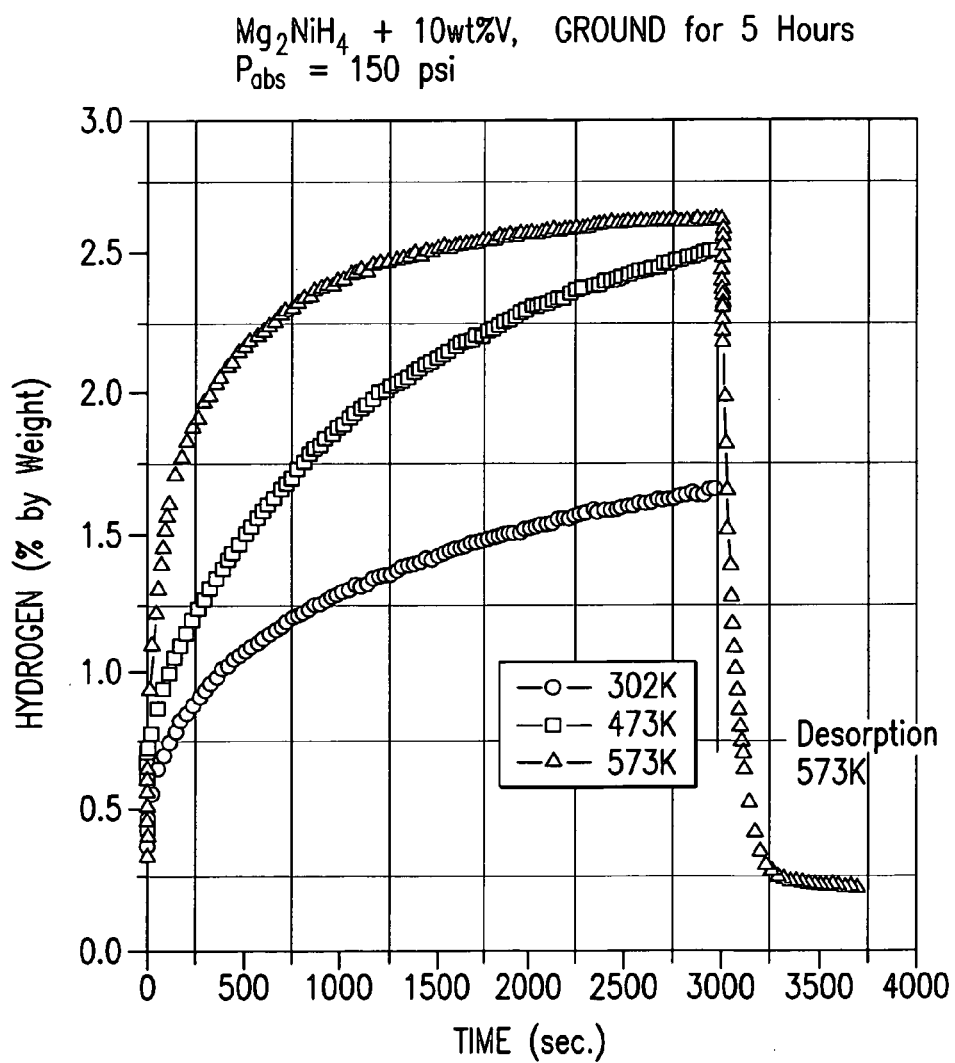
FIG. 23 is a curve giving the hydrogen absorption rates as a function of the time during first absorption cycles carried out at different temperatures under a same pressure of 150 psi on powders of a nanocomposite according to the invention prepared by intensive mechanical grinding for 20 hours followed by desorption of a mixture containing a powder of Mg$_2$NiH$_4$ and 10% of V.
Figure 24:
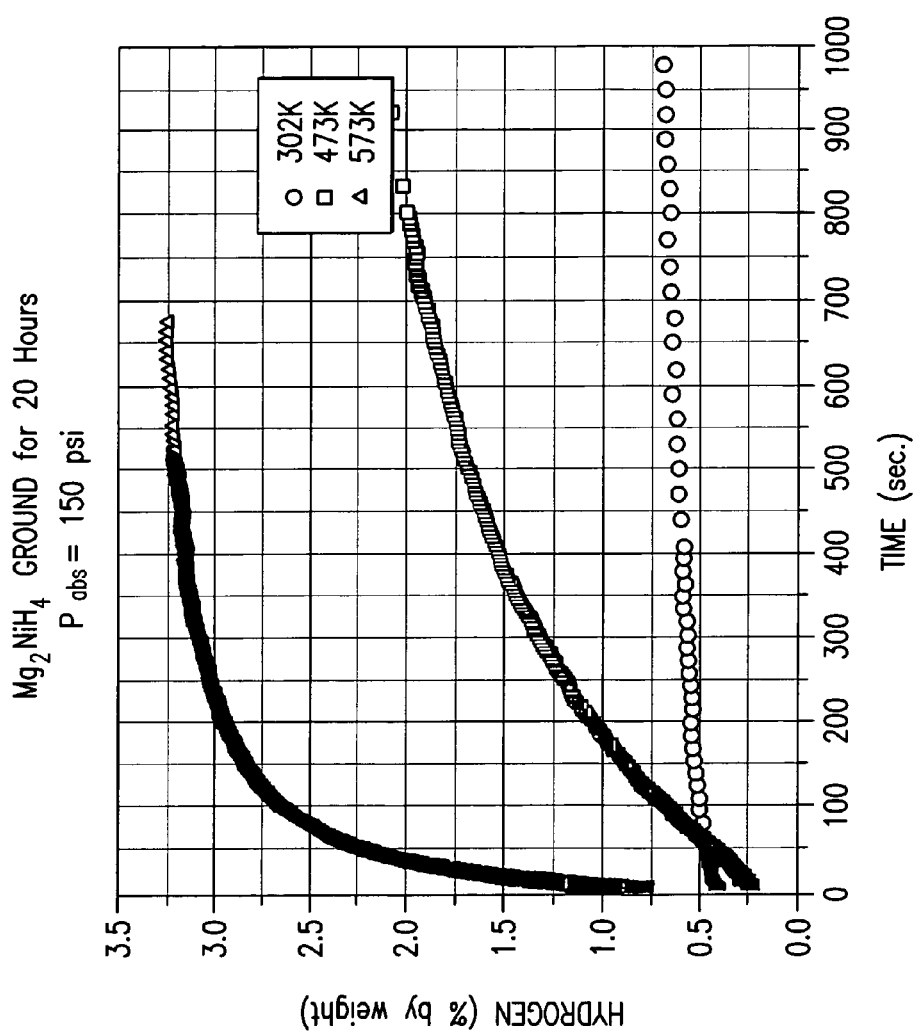
FIG. 24 is a curve similar to the one of FIG. 23, given for comparison purpose, in which measurements were carried out in the same conditions on a nanocrystalline powder preparing by intensive mechanical grinding for 20 hours followed by desorption of a powder of Mg$_2$NiH$_4$ without addition of V.

FIG. 23 gives absorption curves obtained at different temperatures under pressure of 150 psi on a nanocomposite according to the invention prepared by intensive mechanical grinding for 5 hours of $Mg_2NiH_4$ with 10% by weight of V. One can notice that this nanocomposite absorbs almost 1.75% by weight of hydrogen in 3,000 seconds at room temperature (302° K.), which is very remarkable eventhough less performant than $MgH_2$+5% at. of V, which absorbs about 2.75% by weight of hydrogen at room temperature during the same period of time (see FIG. 15). However, this result is very superior to the one obtained with a nanocrystalline $Mg_2NiH_4$ powder obtained after a mechanical grinding of 20 hours (see FIG. 24).

Figure 25:
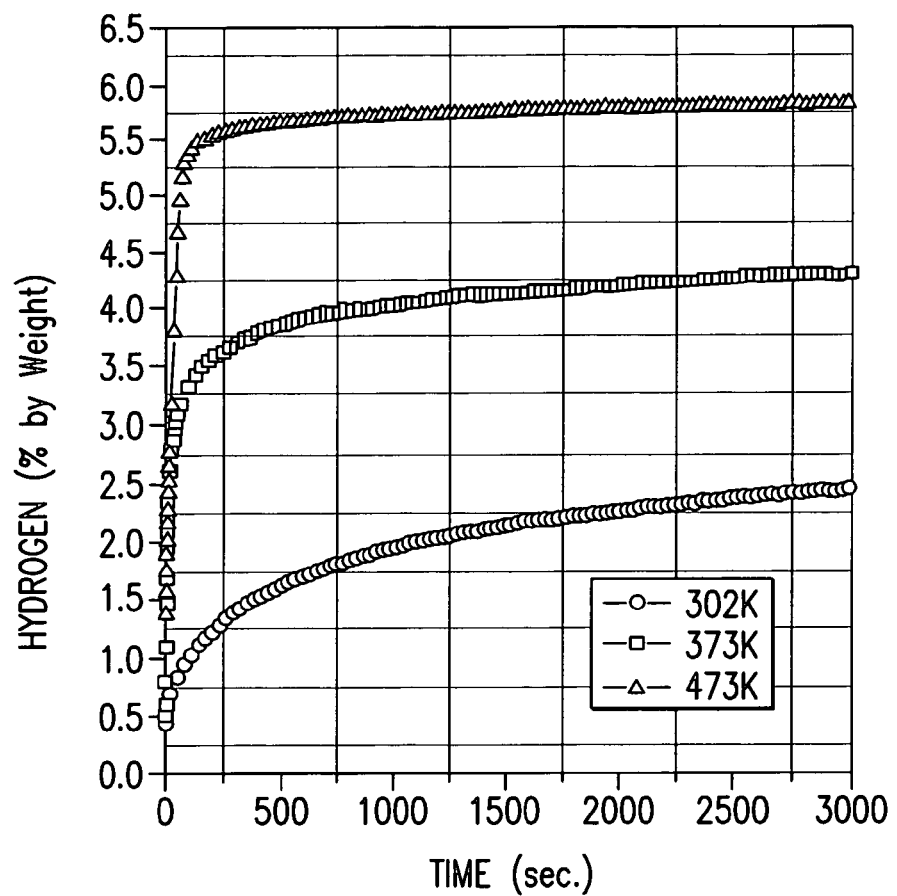
FIG. 25 is a curve giving the hydrogen absorption rates as a function of the time during cycles of absorption carried out at various temperatures under a pressure of 150 psi on powders of a nanocomposite according to the invention prepared by intensive mechanical grinding for 20 hours followed by a desorption and exposition to air for two days, of a mixture containing a powder of MgH$_2$ and 5% at. of a powder of V.

FIG. 25 which is to be compared with FIG. 10, shows that a nanocomposite powder according to the invention made of $MgH_2$ and 5% at. of V can be exposed to air for two days without loosing its properties. This is very important for the practical standpoint.

Figure 26:
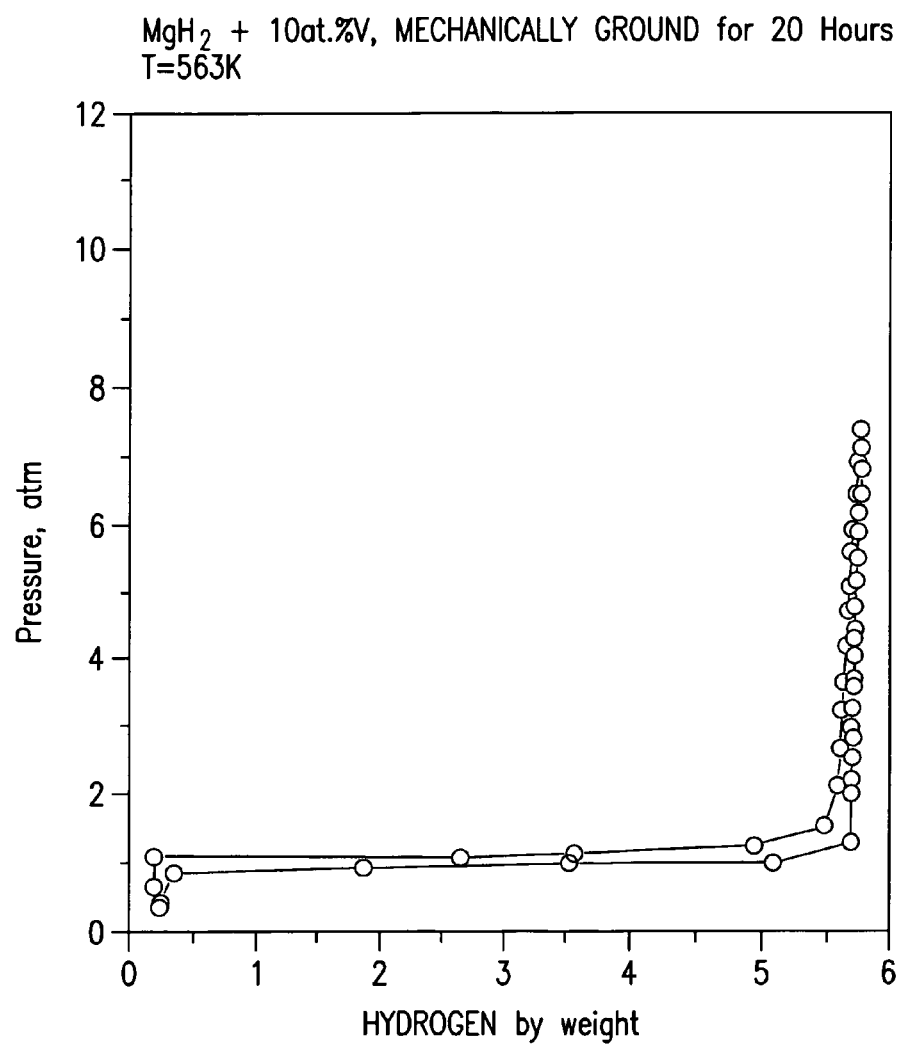
FIG. 26 is a pressure-concentration isothermal curve obtained at a temperature of 563° K. with a nanocomposite according to the invention prepared by intensive mechanical grinding of 20 hours of a mixture containing a powder of MgH$_2$ and 10% at. of V.

FIG. 26 is a pressure-concentration isothermal curve obtained with a nanocomposite according to the invention prepared by intensive mechanical grinding of $MgH_2$ with 10% at. of V. This curve shows that at a temperature of 563° K. (290° C.), the absorption and desorption are almost instantaneous under a pressure as low as one atmosphere.

Figure 27:
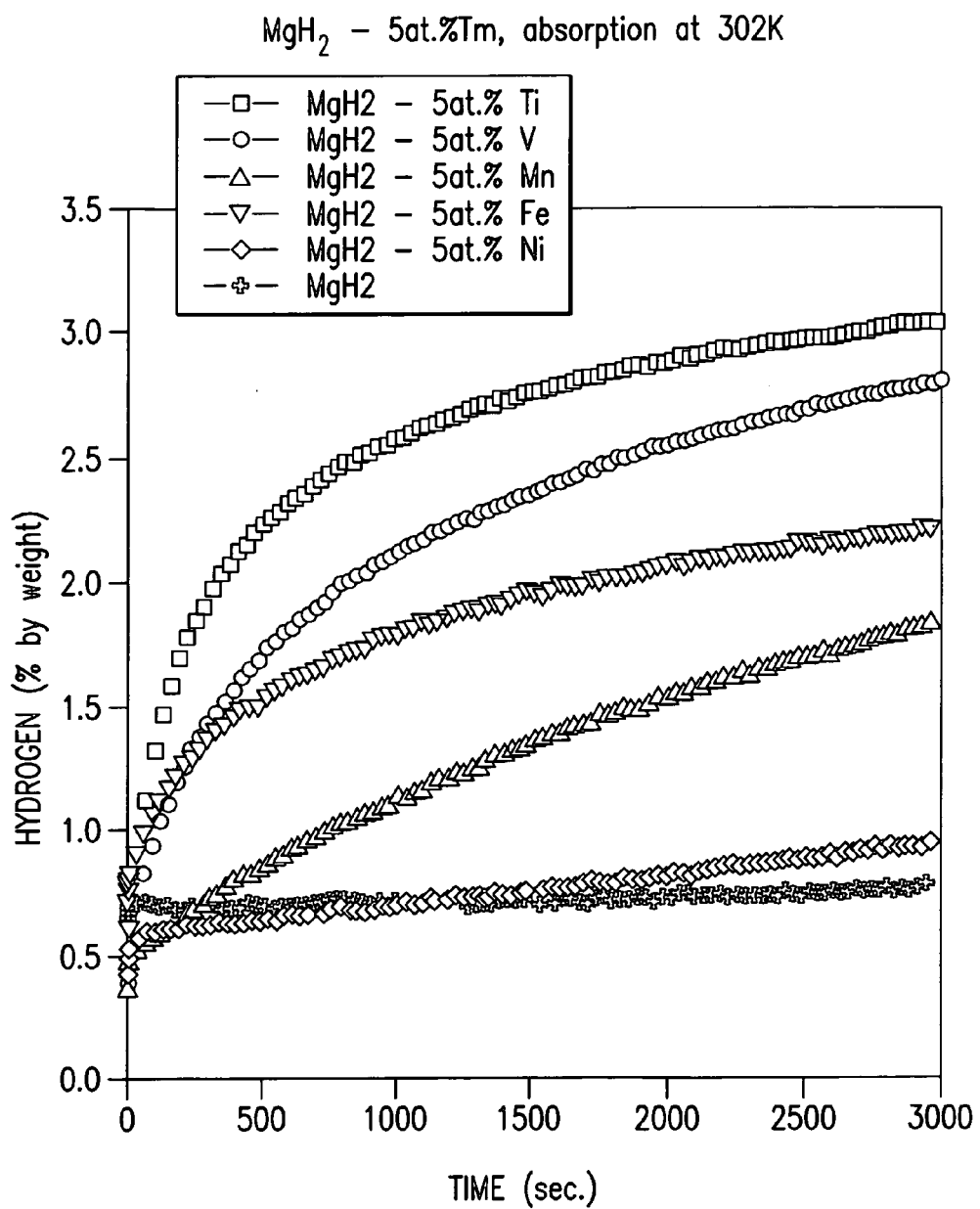
FIG. 27 is a curve giving the hydrogen absorption rates measured as a function of the time during first cycles of absorption carried out at a temperature of 302° K. under a pressure of 150 ps on powders of nanocomposites according to the invention prepared by intensive mechanical grinding for 20 hours followed by desorption of a mixture of a powder of MgH$_2$ with 5% at of a transition metal TM selected amongst Ti, V, Mn, Fe, and Ni, said curve also giving, by way of reference, the absorption rate obtained on nanocrystalline powder of MgH$_2$ without any additive.

FIG. 27 are curve giving the absorption rates of nanocomposites according to the invention prepared by intensive mechanical grinding of $MgH_2$ with 5% at. of different transition elements. As can be seen, the results obtained with titanium are better than those obtained with vanadium. The results obtained with iron and manganese are slightly lower but very superior to those obtained with the addition of nickel or without any addition.

Figure 28:
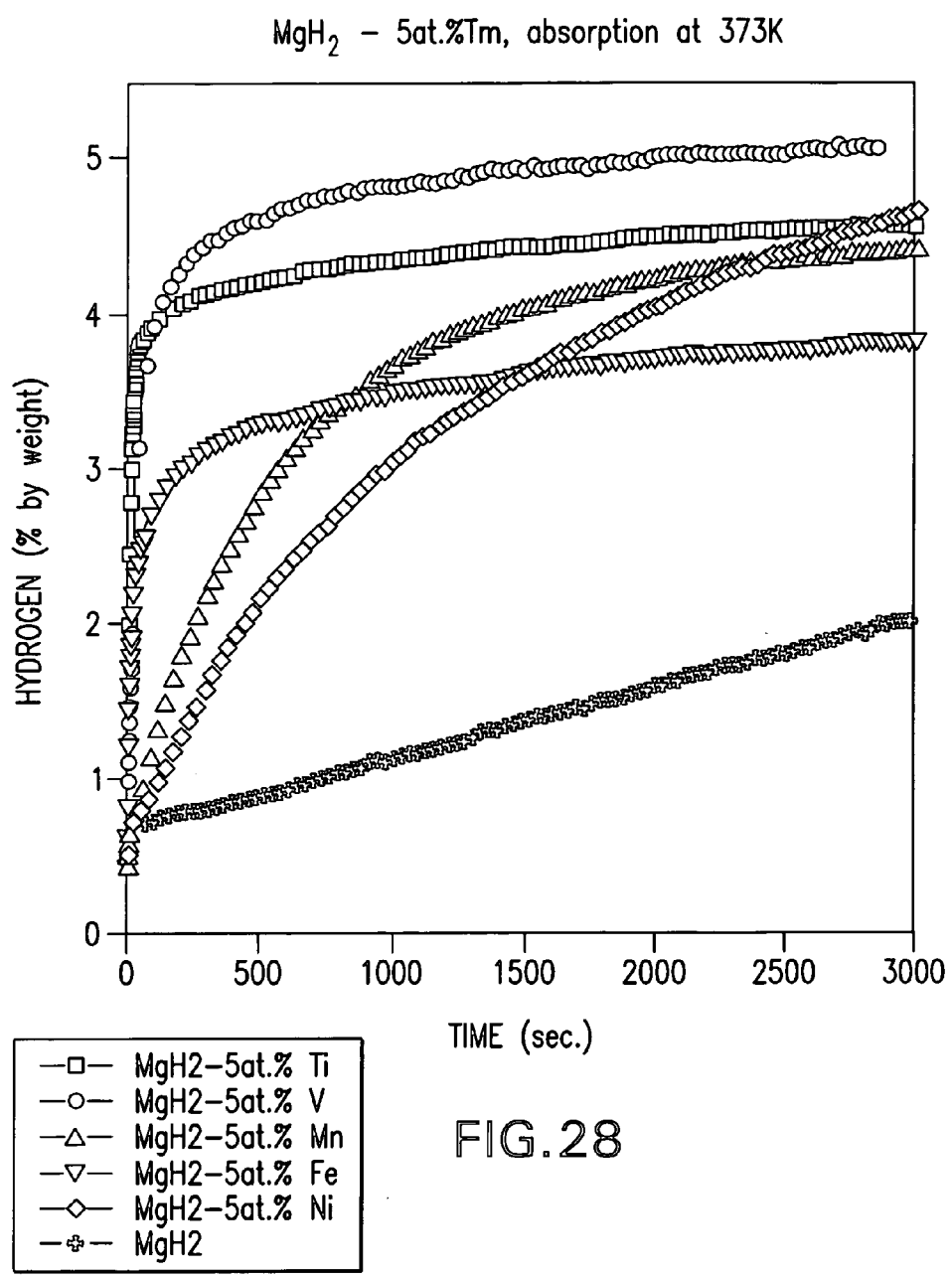
FIG. 28 is a curve identical to the one shown in FIG. 27, except that the absorption temperature was 373° K.
Figure 29:
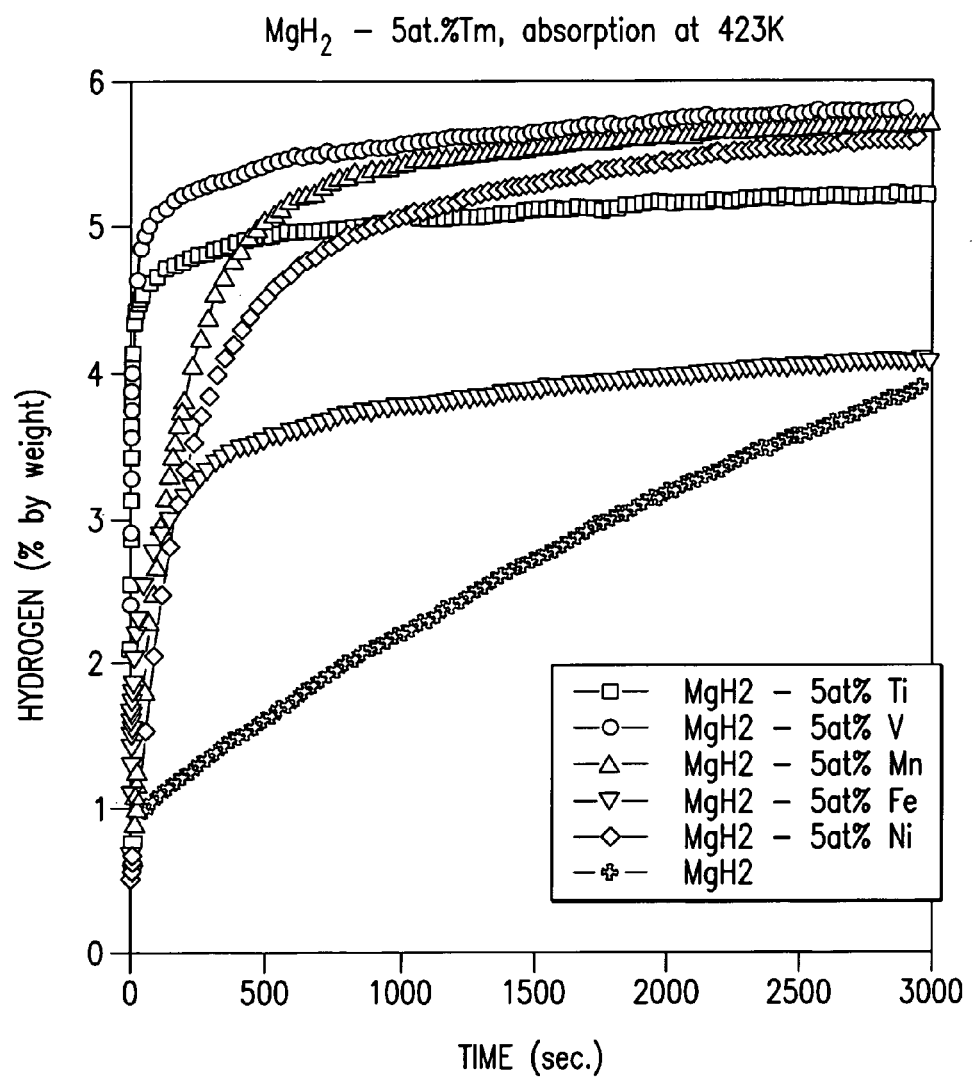
FIG. 29 is a curve identical to the one shown in FIG. 27, except that the absorption temperature was 423° K.

FIGS. 28 and 29 are curves similar to those shown in FIG. 27, at much high temperatures (373° K/100° C. and 423° K/150° C.). As can be noticed, the differences related to the presence of the different additives are reduced as the absorption temperatures increase.

Figure 30:
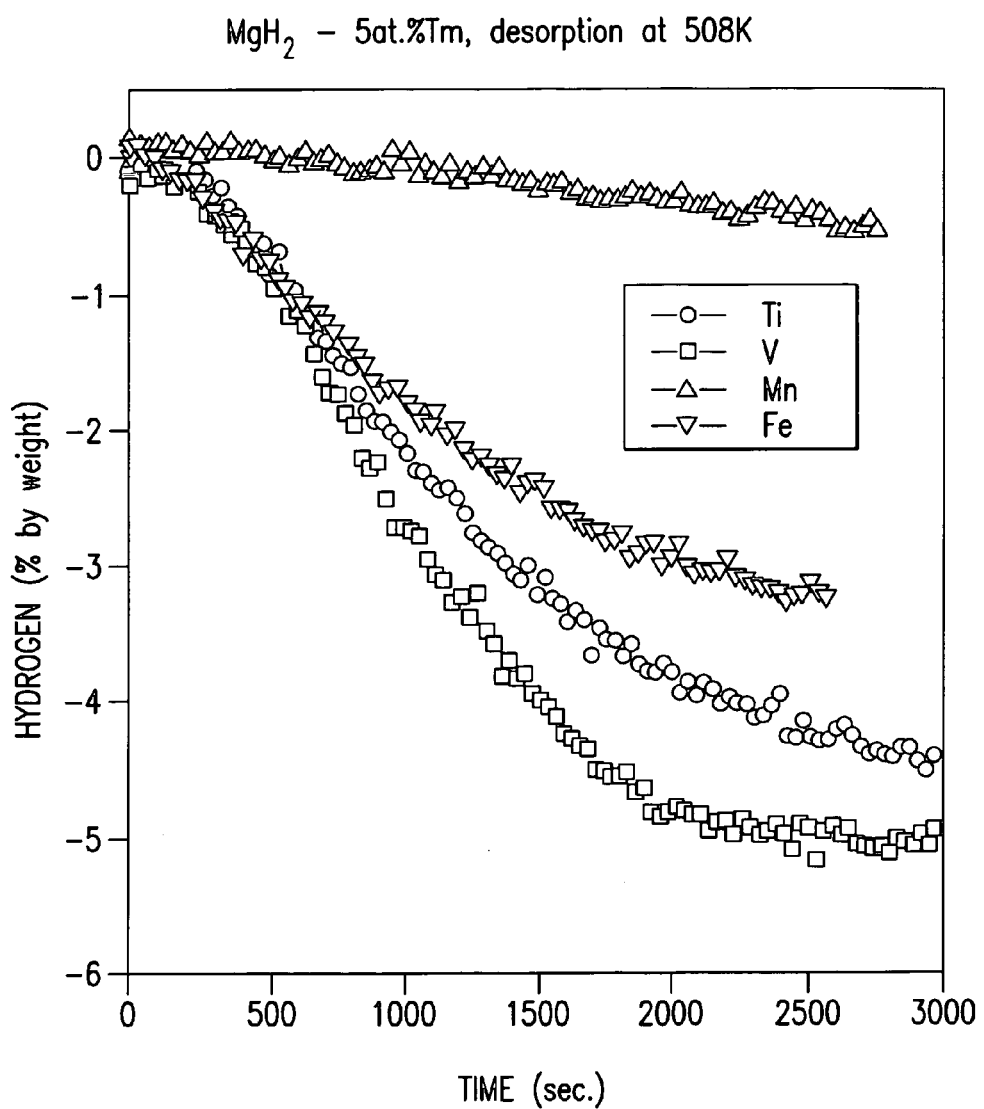
FIG. 30 is a curve giving the hydrogen absorption rates measured at 508° K. under a pressure of 0 psi on nanocrystalline powders according to the invention prepared by intensive mechanical grinding for 20 hours for a mixture of a powder of MgH$_2$ and 5% at of a transition metal TM selected amongst Ti, V, Mn, and Fe.

FIG. 30 are desorption curves obtained at 508° K. (225° C.) under a pressure 0 psi on nanocomposites according to the invention including 5% at. of a transition metal selected amongst Ti, V, Mn, and Fe. These curves show that the desorption when the nanocomposite contains Ti, V and even Fe, is much better than the so-obtained when the additive is manganese.

Figure 31:
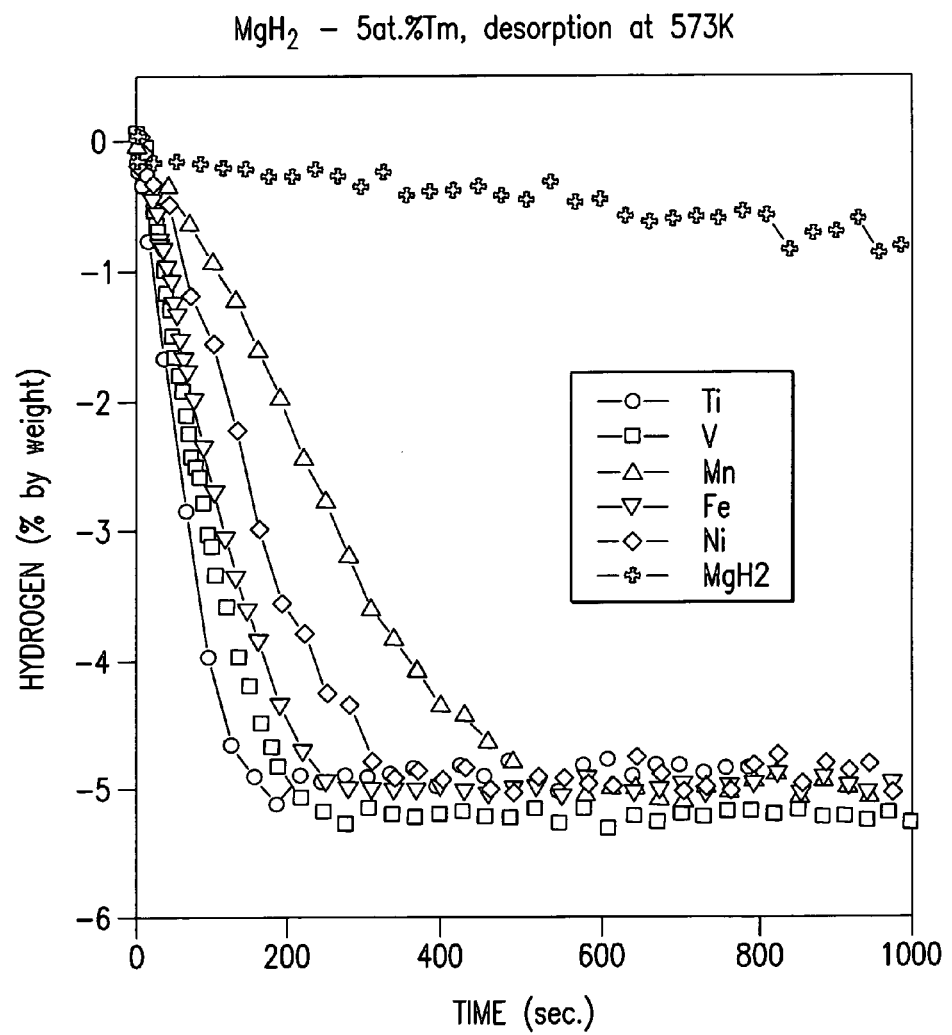
FIG. 31 is a curve similar to the one of FIG. 30, in which the desorption was carried out at 573° K., this curve giving also the desorption obtained on a nanocrystalline powder consisting of MgH$_2$ exclusively, as a reference.
Figure 32:
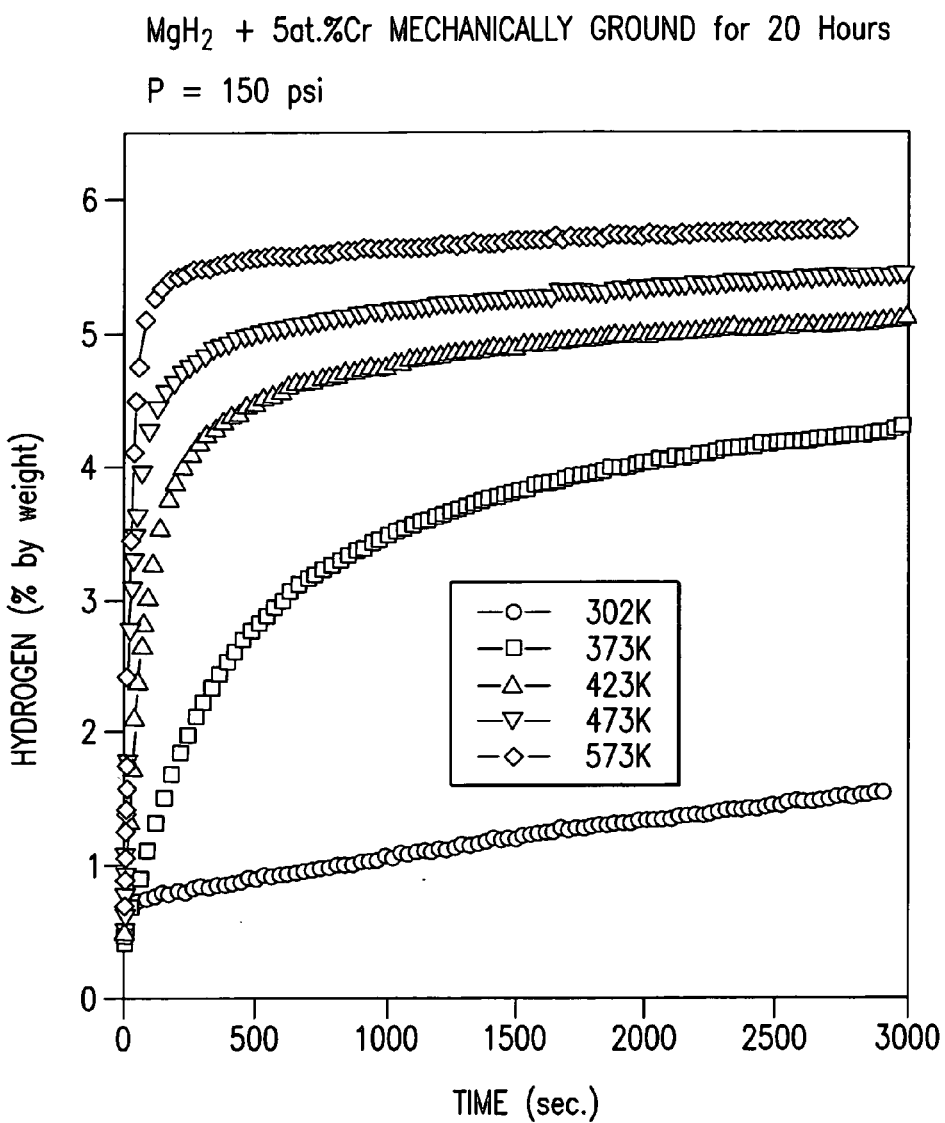
FIG. 32 is a curve giving the hydrogen absorption rates measured as a function of the time during a first cycle of absorption carried out at various temperatures under a pressure of 150 psi on a powder of a nanocomposite according to the invention prepared by intensive mechanical griding during 20 hours and desorption of a mixture of MgH$_2$ with 5% of Cr.
Figure 33:
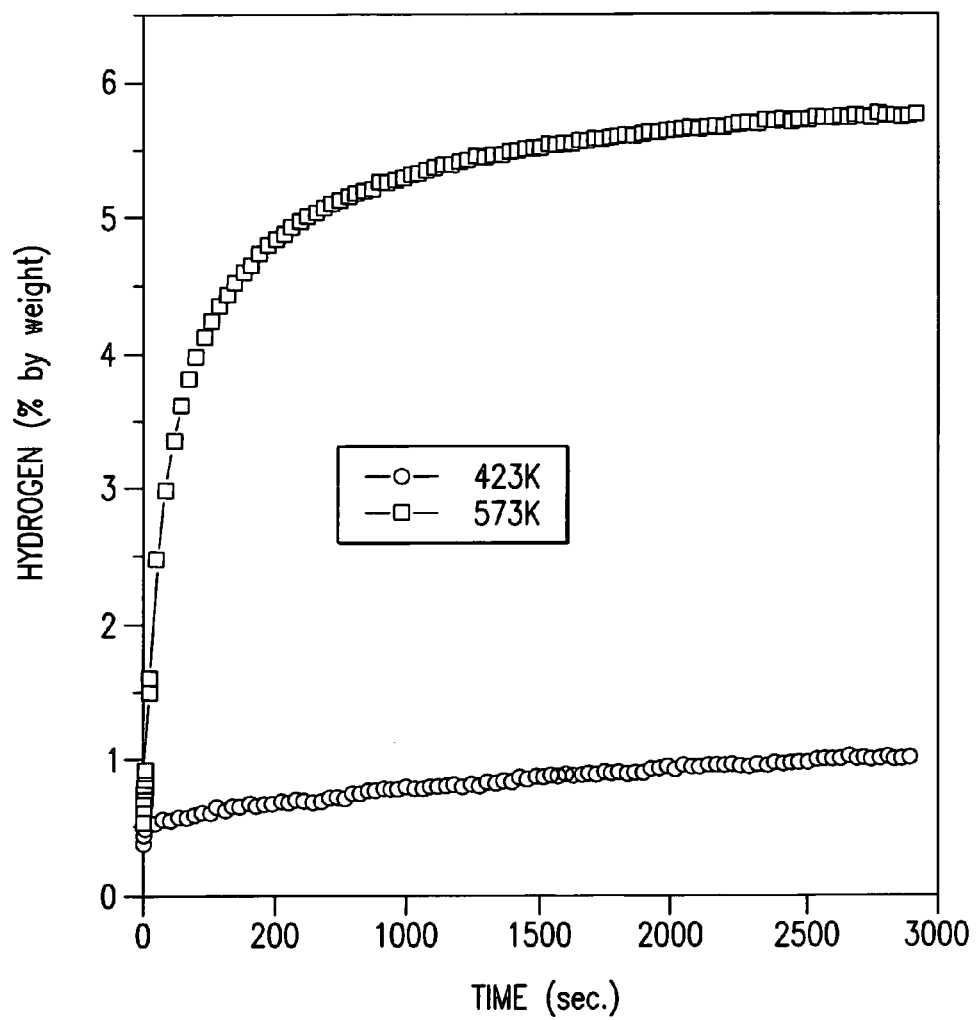
FIG. 33 is a curve giving the hydrogen absorption rate measured as a function of the time during a first absorption cycle carried out various temperatures under a pressure of 150 psi on a powder of a nanocomposite according to the invention prepared by intensive mechanical grinding during 20 hours and desorption of a mixture of MgH$_2$ with 5% at. of Ca.
Figure 34:
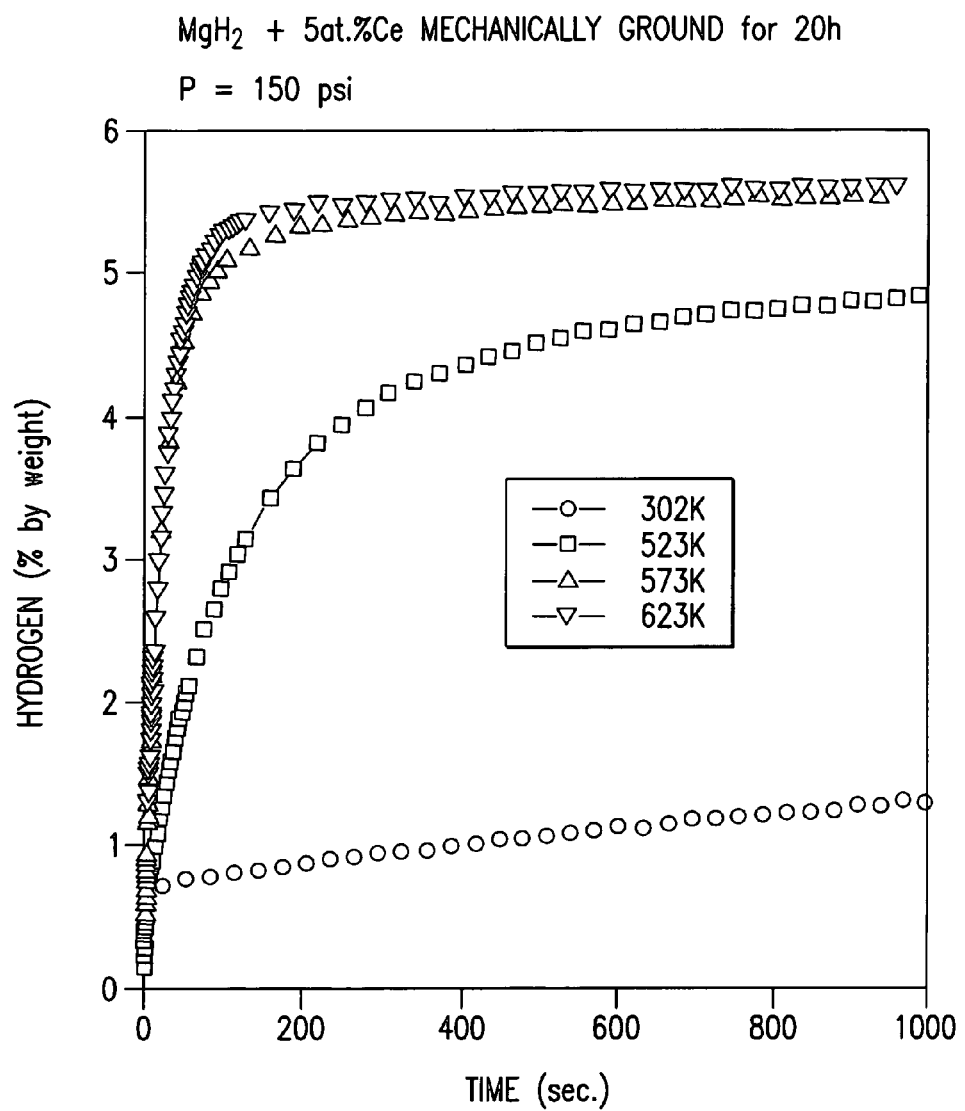
FIG. 34 is a curve giving the hydrogen absorption rate measured as a function of the time during a first cycle of absorption carried out various temperatures under a pressure of 150 psi on a powder of nanocomposite according to the invention prepared by intensive mechanical grinding during 20 hours and desorption of a mixture of MgH$_2$ with 5% at. of Ce.
Figure 35:
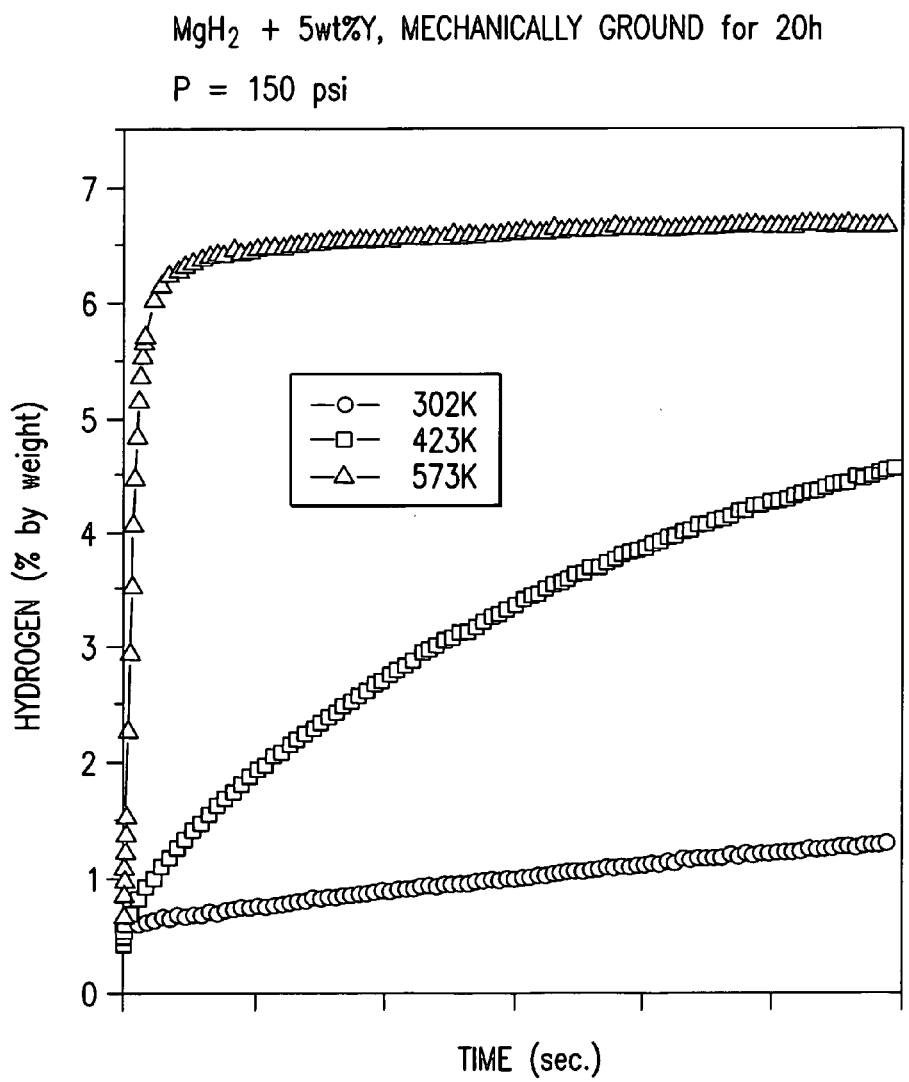
FIG. 35 is a curve giving the hydrogen absorption rate measured as a function of the time during a first absorption cycle carried out at various temperatures under a pressure of 150 psi on a powder of a nanocomposite according to the invention prepared by intensive mechanical grinding during 20 hours and desorption of a mixture of MgH$_2$ with 5% at. of Y.
Figure 36:
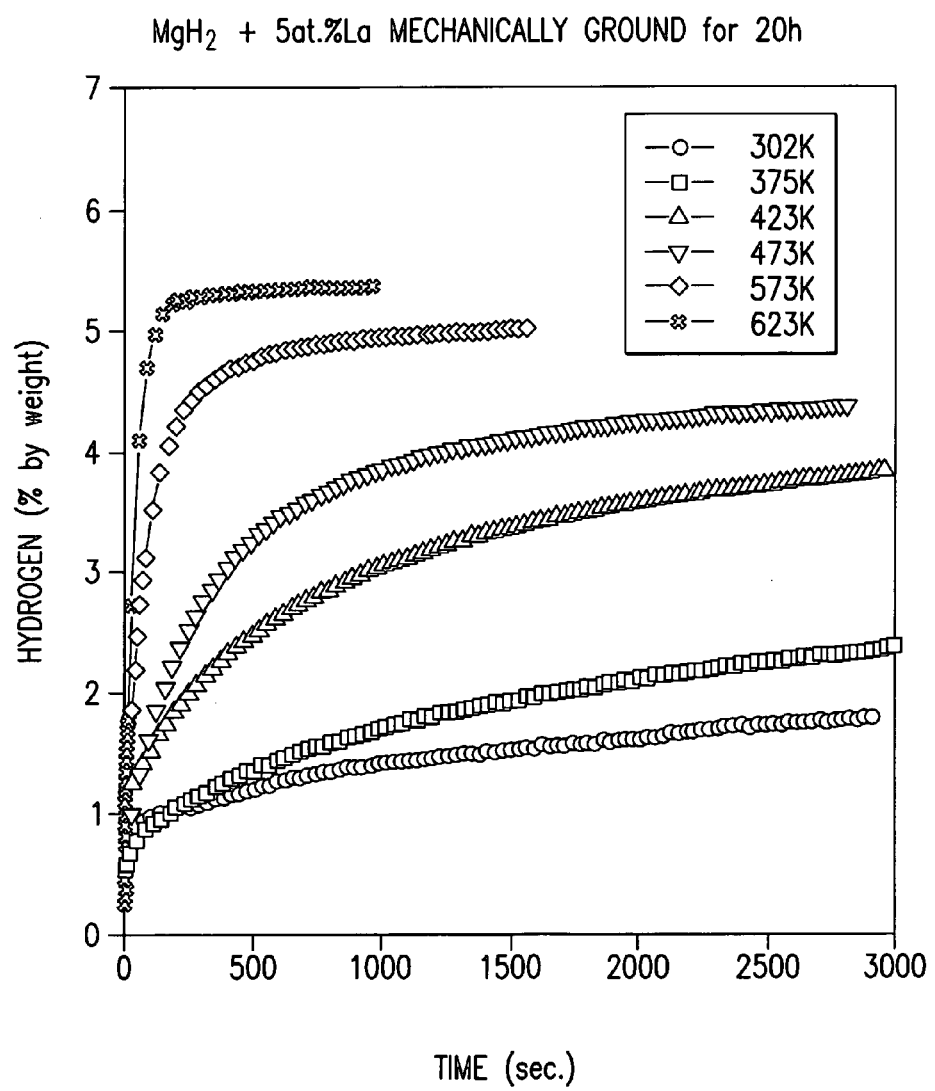
FIG. 36 is a curve giving the hydrogen absorption rates measured as a function of time during a first cycle of absorption carried out at various temperatures under a pressure of 150 psi on a powder of a nanocomposite according to the invention prepared by intensive mechanical grinding during 20 hours and desorption of a mixture of MgH$_2$ with 5% at. of La.

FIG. 31 is similar to FIG. 30, except that the temperature of desorption is 573° K. (300° C.). Once again, one may notice that at high temperature, the differences are reduced. However, in all cases, the obtained results are much better than those obtained with pure $MgH_2$.

FIGS. 32 to 37 are absorption curves obtained at different temperature under a same pressure with nanocomposites according to the invention prepared by intensive mechanical grinding of $MgH_2$ with, respectively, 5% at. of Cr, Ca, Ce, Y and La. These metals are known to be able of absorbing hydrogen and to be not or little miscible with Mg or its equivalent during grinding. As it can be noticed one again, excellent results are obtained.

Figure 37:
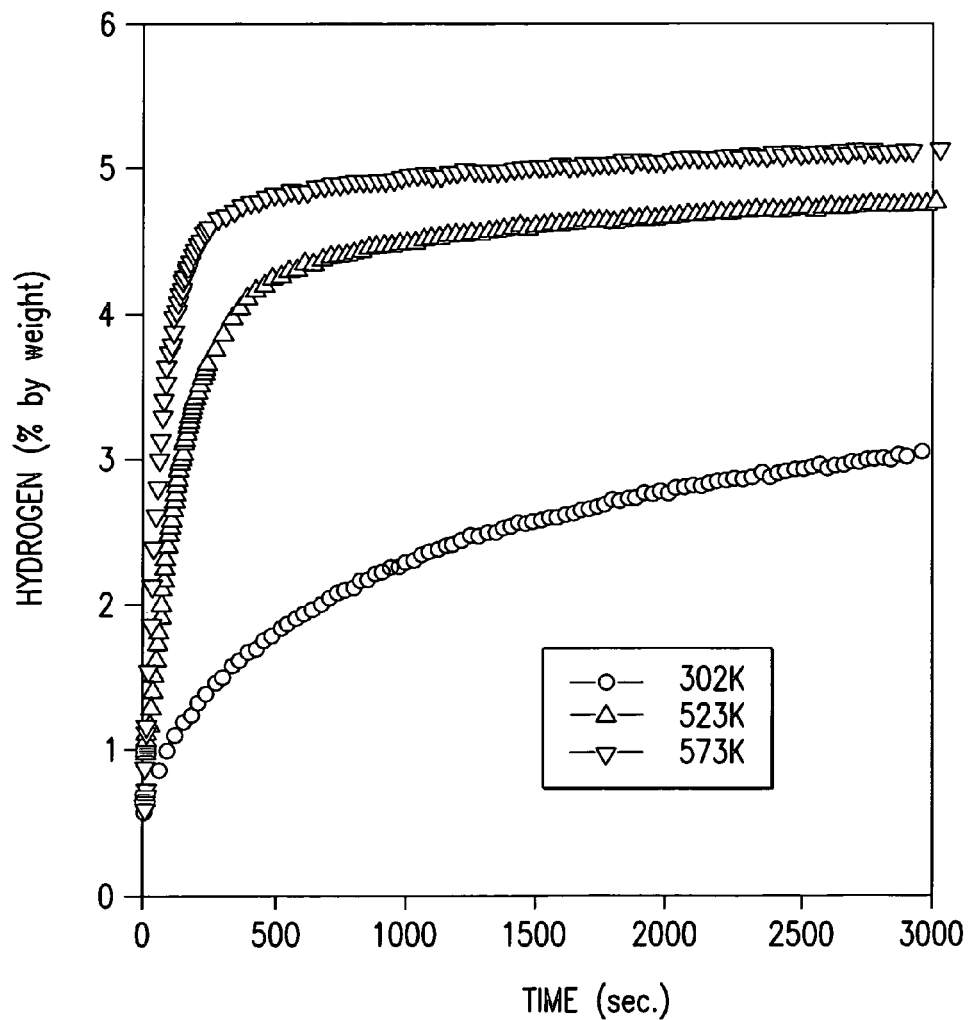
FIG. 37 is a curve giving the hydrogen absorption rates measured as a function of time during a first cycle of absorption carried out various temperatures under a pressure of 150° C. on a nanocomposite according to the invention prepared by intensive mechanical grinding for 20 hours and desorption of a mixture of a powder of MgH$_2$ with 5% at of Ce and 5% at. of La.
Figure 38:
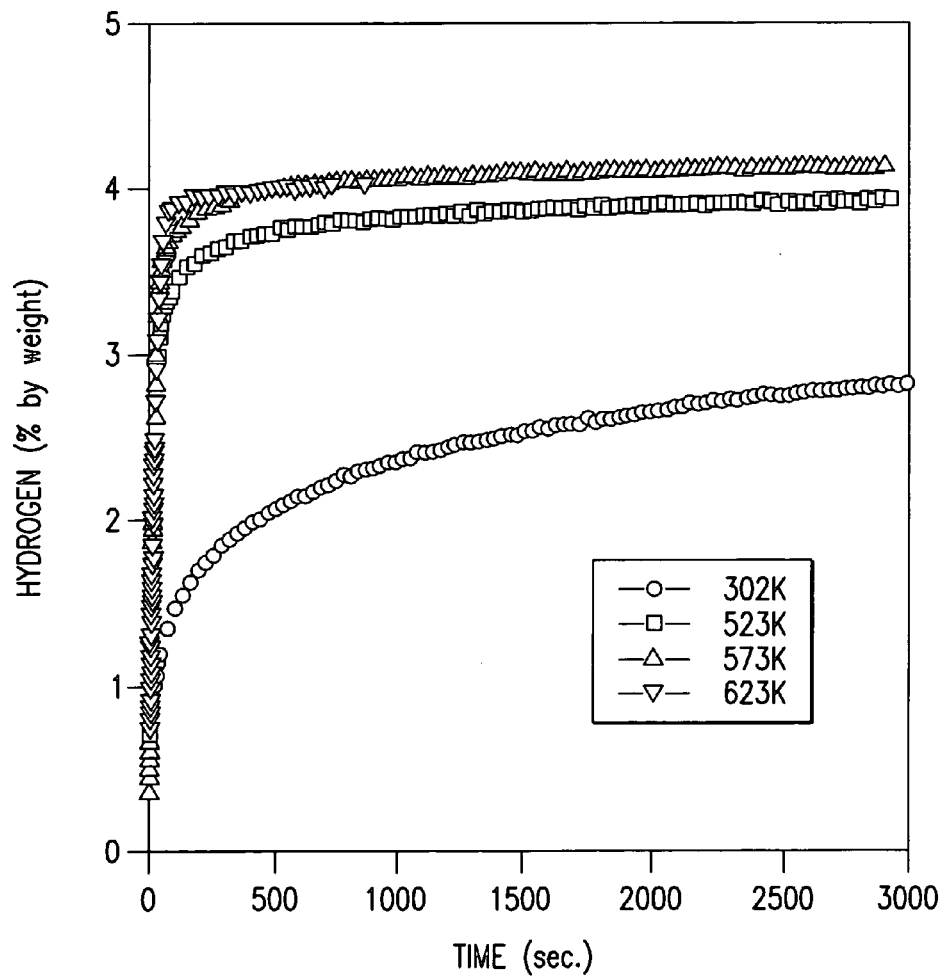
FIG. 38 is a curve giving the hydrogen absorption rates measured as a function of the time during a first cycle of absorption carried out at various temperatures under a pressure of 150 psi on a nanocomposite according to the invention prepared by intensive mechanical grinding for 20 hours followed by a desorption of a mixture of a powder of MgH$_2$ with 5% at of Ce, 5% at of La and 5% of V.
Figure 39:
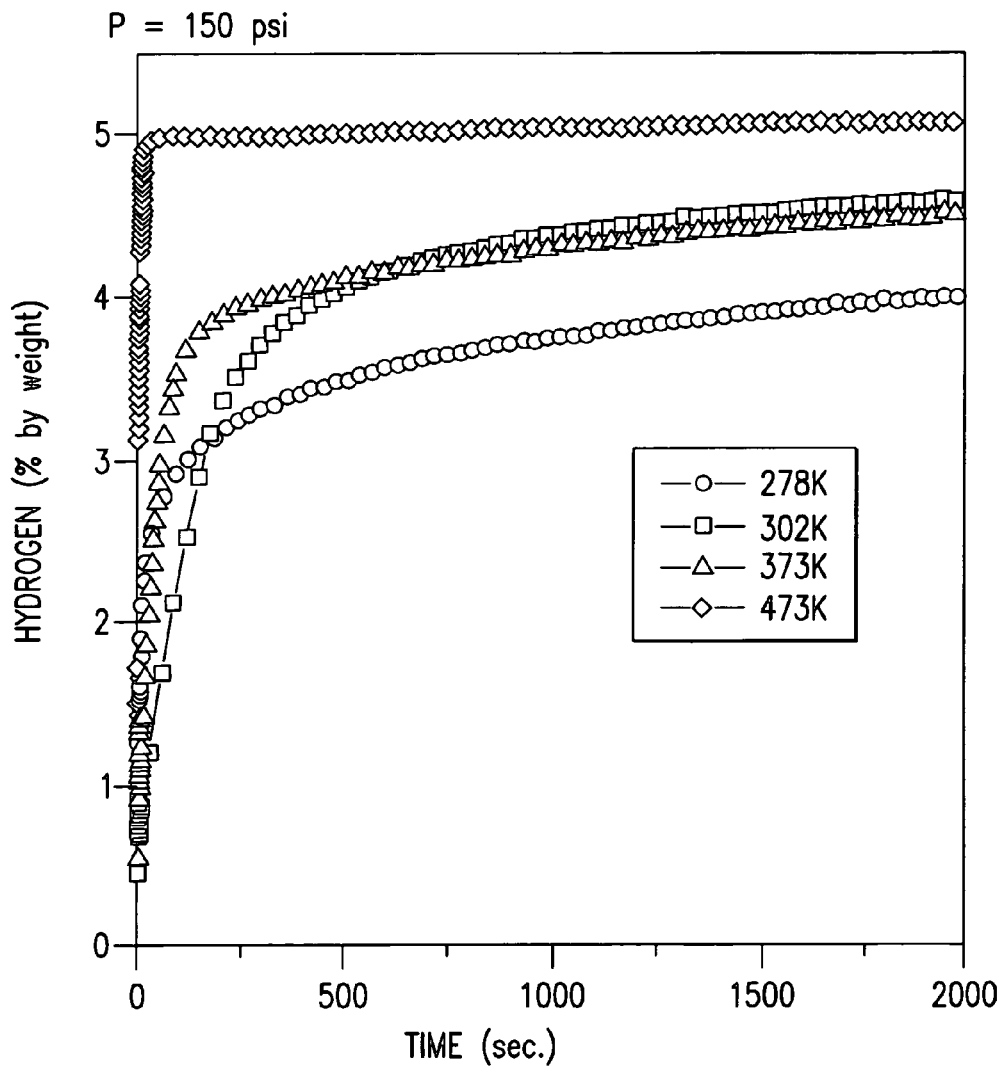
FIG. 39 is a curve giving the hydrogen absorption rates measured as a function of the time during a first absorption cycle carried out various temperatures under a pressure of 150 psi on a nanocomposite according to the invention prepared by intensive mechanical grinding during 20 hours and desorption of a mixture of powder of MgH$_2$ with 7% by weight of V and 30% by weight of LaNi$_5$.

FIGS. 37 to 39 are similar curves showing absorption rates measured at different temperatures under a same pressure of 150 psi with nanocomposites according to the invention prepared by intensive mechanical grinding of $MgH_2$ with more than one additional element or compound. Once again, these curves show that excellent results are obtained.

Figure 40:
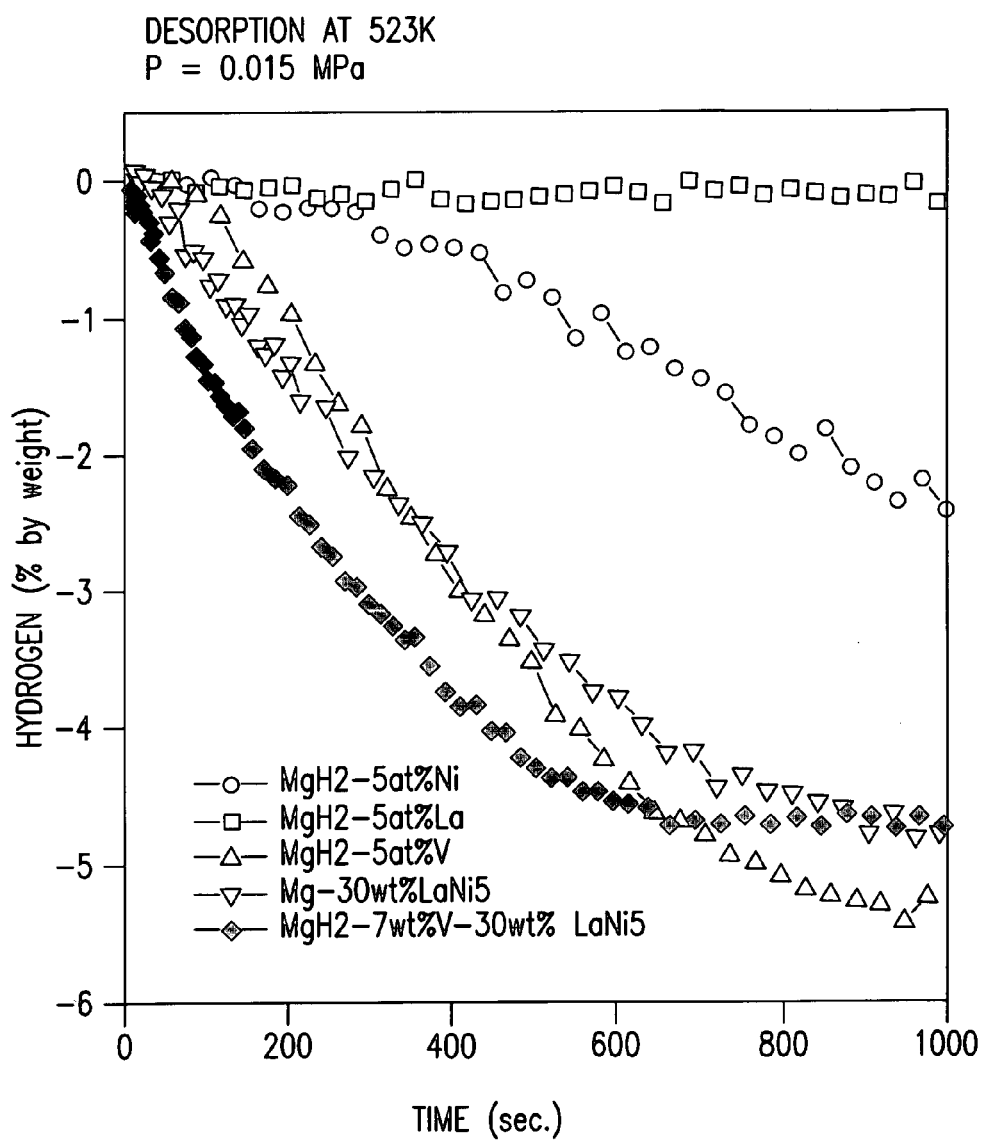
FIG. 40 is a curve giving the hydrogen desorption rates measured as a function of the time during a first cycle of description carried out at a pressure of 0.015 MPA at a temperature of 523° K. on nanocrystalline powders according to the invention prepared by intensive mechanical grinding during 20 hours and desorption of a mixture of a powder of MgH$_2$ with 5% at. of Ni; MgH$_2$ with 5% at of La; MgH$_2$ with 5% at of V; MgH$_2$ with 30% by weight of LaNi$_5$; and MgH$_2$ with 7% by weight of V and 30% by weight of LaNi$_5$, respectively.

FIG. 40 are desorption curves obtained at 523° K. (250° C.) under pressure of 0.015 Mpa with different nanocomposites according to the invention. As can be noticed, those containing vanadium, $LaNi_5$ or a mixture of vanadium and $LaNi_5$ are extremely performant.

By way of information, Table I hereinafter indicates the phase transformations occurring during grinding and after hydrogen desorption for different types of exemplified nanocomposites, whose additional element is a transition metal selected amongst Ti, V, Mn, Fe and Ni. Table II hereinafter indicates the corresponding activation energies for the desorption. As can be seen, it is much easier to desorb hydrogen from $MgH_2$—V, $MgH_2$—Fe and $MgH_2$—Ti systems than from $MgH_2$—Ni and $MgH_2$—Mn systems. However, in all cases, the desorption is much easier than with $MgH_2$ ground alone or even more, with pure unground $MgH_2$.

TABLE I

Phase transformation during grinding and dehydrogenation

| Mechanical grinding | Desorption |
|---|---|
| $\beta$-$MgH_2$ + Ti $\Longrightarrow$ $\gamma$-$MgH_2$ + $\beta$ $MgH_2$ + $TiH_2$ + Mg | $\Longrightarrow$ $TiH_2$ + Mg |
| $\beta$-$MgH_2$ + V $\Longrightarrow$ $\gamma$-$MgH_2$ + $\beta$ $MgH_2$ + $VH_x$ + Mg | $\Longrightarrow$ Mg + V |
| $\beta$-$MgH_2$ + Mn $\Longrightarrow$ $\gamma$-$MgH_2$ + $\beta$ $MgH_2$ + Mn | $\Longrightarrow$ Mg + Mn |
| $\beta$-$MgH_2$ + Fe $\Longrightarrow$ $\gamma$-$MgH_2$ + $\beta$ $MgH_2$ + $Mg_2FeH_6$ | $\Longrightarrow$ Mg + Fe |
| $\beta$-$MgH_2$ + Ni $\Longrightarrow$ $\gamma$-$MgH_2$ + $\beta$ $MgH_2$ + $Mg_2NiH_4$ | $\Longrightarrow$ Mg + $Mg_2Ni$ |

TABLE II

Activation energy for th desorption (KJ/mol)

| Mg-Ti | Mg-V | Mg-Mn | Mg-Fe | Mg-Ni | Ground $MgH_2$ | Ground $MgH_2$ |
|---|---|---|---|---|---|---|
| 71.1 | 62.34 | 104.59 | 67.6 | 88.1 | 120 | 156 |

The invention claimed is:

1. A process for preparing a composite of nanocrystalline structure based on magnesium and at least one or several other elements or compounds known to absorb hydrogen and to be very few miscible with magnesium or its hydride during grinding, characterized in that it comprises:
   a) subjecting magnesium or a magnesium-based compound known to absorb hydrogen, to a hydrogenation in order to obtain a hydride in the form of a powder;
   b) mixing the so-obtained hydride in a powder form with the other element(s) or compound(s) or with a hydride of said other element(s) or compound(s) to obtain a mixture;
   c) subjecting the so-obtained mixture to an intensive mechanical grinding in order to obtain a composite of nanocrystalline structure in the form of a hydride with an average crystal size between 0.1 nm and 100 nm; and, if required,
   d) subjecting the composite obtained in step c) to a hydrogen desorption, with the proviso that said other element(s) or compound(s) or their hydride(s) is not $Mg_2NiH_4$.

2. The process according to claim 1, characterized in that step a) is carried out with magnesium.

3. The process according to claim 1, characterized in that step a) is carried out with a magnesium-based compound of the formula:

$$Mg_{1-x}A_x$$

wherein A is at least one element selected from the group consisting of Li, Ca, Ti, V, Cr, Mn, Fe, Co, Ni, Cu, Zn, Al, Y, Zr, Nb, Mo, In, Sn, O, Si, B, C, F and Be, and x is a number equal to or lower than 0.3.

4. The process according to claim 1, characterized in that step a) is carried out with a magnesium-based compound of the formula:

$$(Mg_{2-z}Ni_{1+z})_{1-x}A_x$$

wherein A is at least one element selected from the group consisting of Li, Ca, Ti, V, Cr, Mn, Fe, Co, Ni, Cu, Zn, Al, Y, Zr, Nb, Mo, In, Sn, O, Si, B, C, F and Be, and x is a number equal to or lower than 0.3 and z is a number comprised between −0.3 to +0.3.

5. The process according to claim 1, characterized in that step b) is carried out with another element and said other element is selected from the group consisting of V, Ti, Fe, Co, Nb, Ca, Cs, Mn, Ni, Ca, Ce, Y, La, Pd, Hf, K, Rb, Rh, Ru, Zr, Be, Cr, Ge, Si, Li and their hydrides.

6. The process according to claim 5, characterized in that the other element is V.

7. The process according to claim 5, characterized in that the other element is Nb.

8. The process according to claim 1, characterized in that step b) is carried out with another compound and said other compound is selected from the group consisting of $LaNi_5$, $MnNi_5$, $ZrMn_2$, $ZrV_2$, $TiMn_2$, $Mg_2Ni$ and their hydrides except $Mg_2NiH_4$, the solid solutions of the formula $V_{1-y}Ti_y$ where y ranges from 0 to 1, $(V_{0.9}Ti_{0.1})_{0.95}Fe_{0.05}$ and the atmosphere alloys of Mg—Ti.

9. The process according to claim 6, characterized in that in step b), the atomic or molar percentage of said other element in the mixture is equal to or lower than 10%.

10. The process according to claim 9, characterized in that, in step b), the atomic percentage of said other element in the mixture is equal to 5%.

11. The process according to claim 9 characterized in that, in step b), the atomic percentage of said other element in a mixture is equal to 3%.

12. The process according to claim 1, characterized in that in step c), the mixture is subjected to an intensive mechanical grinding in a ball milling machine for a period of 5 to 20 hours.

13. The process according to claim 1, wherein the nano-composite based on magnesium and one or more other elements or compounds known to absorb hydrogen has a very fine microstructure with activated interfaces.

14. The process according to claim 7, characterized in that in step b), the atomic or molar percentage of said other element in the mixture is equal to or lower than 10%.

15. The process according to claim 14, characterized in that, in step b), the atomic percentage of said other element in a mixture is equal to 3%.

16. The process according to claim 14, characterized in that, in step b), the atomic percentage of said other element in the mixture is equal to 5%.

* * * * *